(12) United States Patent
Jørgensen et al.

(10) Patent No.: US 11,285,703 B2
(45) Date of Patent: Mar. 29, 2022

(54) VIG UNIT LAMINATION

(71) Applicant: VKR Holding A/S, Hørsholm (DK)

(72) Inventors: Kristian Damholdt Jørgensen, Hørsholm (DK); Thomas Villiam Sejer Mikkelsen, Hørsholm (DK); Karsten Hansgaard Nielsen, Hørsholm (DK); Thomas Lind Madsen, Hørsholm (DK); Henrik Jensen, Hørsholm (DK); Willibrordus Servatius Bouwens, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 0 days.

(21) Appl. No.: 17/057,739

(22) PCT Filed: May 24, 2019

(86) PCT No.: PCT/EP2019/063477
§ 371 (c)(1),
(2) Date: Nov. 23, 2020

(87) PCT Pub. No.: WO2019/224358
PCT Pub. Date: Nov. 28, 2019

(65) Prior Publication Data
US 2021/0293078 A1    Sep. 23, 2021

(30) Foreign Application Priority Data

May 24, 2018 (DK) .............................. PA201870312
Jun. 28, 2018 (DK) .............................. PA201870446

(51) Int. Cl.
*E06B 3/673* (2006.01)
*B32B 17/10* (2006.01)
(Continued)

(52) U.S. Cl.
CPC .......... *B32B 17/10871* (2013.01); *B32B 3/10* (2013.01); *B32B 17/10055* (2013.01);
(Continued)

(58) Field of Classification Search
CPC .... E06B 3/66366; E06B 3/6715; E06B 3/673; E06B 3/67386; E06B 3/6775;
(Continued)

(56) References Cited

U.S. PATENT DOCUMENTS 5,087,502 A * 2/1992 Esposito ................ B26F 1/3813
428/156
5,812,332 A * 9/1998 Freeman .................. B32B 3/02
359/894

(Continued)

FOREIGN PATENT DOCUMENTS

CN          2835403 Y    11/2006
CN        202164971 U     3/2012
(Continued)

OTHER PUBLICATIONS

Machine translation of applicant cited CN 206418926 (Year: 2017).*
(Continued)

*Primary Examiner* — Donald J Loney
(74) *Attorney, Agent, or Firm* — Cantor Colburn LLP

(57) ABSTRACT

The present disclosure relates to a laminated vacuum insulated glass (VIG) unit (1) comprising: a vacuum insulated glass (VIG) unit (11) comprising at least two thermally tempered glass sheets (11a, 11b) separated by a plurality of support structures (12) distributed in a gap (13) between the tempered glass sheets (11a, 11b), and a lamination layer (2) arranged between one of the thermally tempered glass sheets (11a, 11b) of the vacuum insulated glass (VIG) unit (11) and a further sheet (3). The thickness (Th1) of the lamination layer (2) is between 0.25 mm and 3 mm, such as between 0.4

(Continued)

Figure 1:
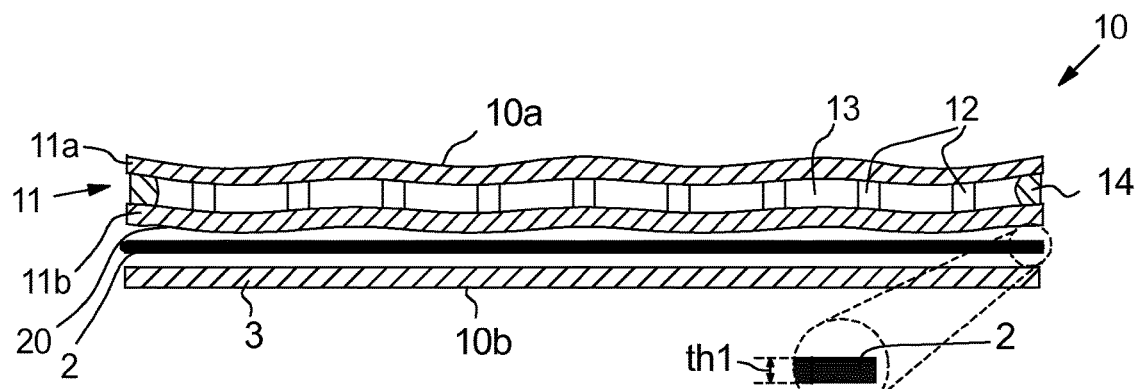

mm and 3 mm, for example between 0.7 mm and 2.4 mm, and the lamination layer thickness varies (VAR1) with at least 0.1 mm such as at least 0.2 mm, e.g. at least 0.3 mm between the further sheet (3) and the vacuum insulated glass (VIG) unit (11). The disclosure additionally relates to use of a method and use of a system for providing laminated vacuum insulated glass (VIG) units (200).

18 Claims, 20 Drawing Sheets

(51) Int. Cl.
| | |
|---|---|
| *B32B 3/10* | (2006.01) |
| *B32B 37/06* | (2006.01) |
| *B32B 37/08* | (2006.01) |
| *B32B 41/00* | (2006.01) |
| *E06B 3/66* | (2006.01) |
| *B32B 37/00* | (2006.01) |
| *C03C 27/06* | (2006.01) |
| *B32B 38/00* | (2006.01) |

(52) U.S. Cl.
CPC .. *B32B 17/10091* (2013.01); *B32B 17/10174* (2013.01); *B32B 17/10302* (2013.01); *B32B 17/10743* (2013.01); *B32B 17/10788* (2013.01); *B32B 37/0046* (2013.01); *B32B 37/06* (2013.01); *B32B 37/08* (2013.01); *B32B 38/0036* (2013.01); *B32B 41/00* (2013.01); *C03C 27/06* (2013.01); *E06B 3/6612* (2013.01); *E06B 3/673* (2013.01); *E06B 3/6736* (2013.01); *B32B 2307/304* (2013.01); *B32B 2307/412* (2013.01); *B32B 2315/08* (2013.01); *B32B 2419/00* (2013.01)

(58) Field of Classification Search
CPC ...... Y02B 90/22; Y02B 80/22; Y02A 30/249; B32B 3/30; B32B 17/10788; B32B 17/10055; B32B 17/10091
See application file for complete search history.

(56) References Cited

U.S. PATENT DOCUMENTS

| | | |
|---|---|---|
| 6,071,575 A | 6/2000 | Collins |
| 2006/0154005 A1 | 7/2006 | Misonou |
| 2012/0210750 A1 | 8/2012 | Cooper |

FOREIGN PATENT DOCUMENTS

| | | |
|---|---|---|
| CN | 103359956 A | 10/2013 |
| CN | 206418926 U | 8/2017 |
| EP | 1544180 A1 | 6/2005 |
| EP | 1923921 A2 | 5/2008 |
| JP | 2002326843 A | 11/2002 |
| JP | 2004323317 A | 11/2004 |
| KR | 20140032367 A | 3/2014 |
| WO | 2005000762 A1 | 1/2005 |
| WO | 2010011742 A1 | 1/2010 |
| WO | 2012157616 A1 | 11/2012 |
| WO | 2017210701 A1 | 12/2017 |

OTHER PUBLICATIONS

International Search Report for corresponding application PCT/EP2019/063477 filed May 24, 2019; dated Sep. 30, 2019.
International Search Report for corresponding application PCT/EP2019/063486 filed May 24, 2019; dated Sep. 30, 2019.
International Search Report for corresponding application PCT/EP2019/063491 filed May 24, 2019; dated Sep. 30, 2019.
International Search Report for corresponding application PCT/EP2019/063495 filed May 24, 2019; dated Sep. 30, 2019.

* cited by examiner

VIG UNIT LAMINATION

The present disclosure relates to a laminated vacuum insulated glass unit, to use of a method, and to use of a system for providing laminated vacuum insulated glass units.

BACKGROUND

A desire to laminate vacuum insulated glass (VIG) units is present to for example improve safety in case a glass sheet of the VIG unit breaks. A VIG unit may comprise glass sheets kept separated by support structures arranged in an airtight and evacuated gap between the glass sheets.

CN103359956 A discloses an autoclave based VIG lamination solution. US2006/0154005, U.S. Pat. No. 6,071,575 and JP 2004-323317 discloses further solutions for laminating VIG units.

It has however shown that issues relating to laminating VIG units may occur. The present disclosure relates to a laminated VIG unit and to providing an improved solution for laminating VIG units such as VIG units for covering apertures in buildings and/or for other purposes, which may reduce or solve one or more of such issues.

SUMMARY

The present disclosure relates to a laminated vacuum insulated glass (VIG) unit comprising:

a vacuum insulated glass unit comprising at least two thermally tempered glass sheets separated by a plurality of support structures distributed in a gap between the tempered glass sheets, and a lamination layer arranged between one of the thermally tempered glass sheets of the vacuum insulated glass (VIG) unit and a further sheet, wherein the thickness of the lamination layer is between 0.25 mm and 3 mm, such as between 0.4 mm and 3 mm, for example between 0.7 mm and 2.4 mm, and wherein the lamination layer thickness may vary with at least 0.1 mm such as at least 0.2 mm, e.g. at least 0.3 mm between the further sheet and the vacuum insulated glass (VIG) unit.

The present inventors have found that a thickness of the lamination layer in the mentioned range may provide a lamination layer that may take up/help to handle surface variations in thermally tempered glass sheets. This may enable a lamination of VIG units having tempered glass sheets, and that e.g. may be manufactured in a way that may suit a larger scale production of laminated VIG units and/or provide VIG units of satisfactory lamination quality and having very good insulating properties. It may also provide a solution wherein the thickness of the lamination layer varies in accordance with the surface variation of the thermally tempered VIG unit glass sheet proximate the lamination layer. As the lamination layer has a thickness that may be sufficient to take up surface variations of the thermally tempered glass sheets facing the lamination layer, this may provide that the lamination layer thickness, after the lamination, may vary in accordance with the surface variation of the thermally tempered VIG unit glass sheet. This may e.g. help to provide that further sheet, such as a glass sheet, e.g. an annealed glass sheet, having less surface variations may be used as the further sheet, and/or may improve the selection possibilities when choosing a further sheet for the lamination assembly.

The variation of the lamination layer thickness may e.g. be measured across the major surface of the VIG unit between the further sheet and the outer VIG unit surface facing the lamination layer. The thickness variation may be caused by surface variations provided by supports such as rollers during manufacturing or the tempered glass sheet, and/or due to a more "global" surface variations of the tempered glass sheet of the VIG unit. These variations may partly be levelled out due to the reduced pressure in the VIG unit gap. Also, the support structures may provide a surface variation due to the evacuation of the gap of the VIG unit.

The gap of the VIG unit may have been evacuated to a pressure below $10^{-3}$ bar such as at or below $10^{-2}$, $10^{-3}$ or $10^{-4}$ mbar prior to the lamination process.

In one or more aspects of the present disclosure, said lamination layer may be arranged proximate to a major surface of the VIG unit comprising a sealed gap evacuation opening. This may help to provide a mechanical protection for the evacuation opening area, and the thickness of the lamination layer may be advantageous in such areas in order to be able to take up a part of the sealing system that provides the sealing of the evacuation opening. Such an evacuation opening in the thermally tempered glass sheets of the VIG unit may though in further aspects be omitted, and the gap may be evacuated in another way.

In one or more aspects of the present disclosure, said sealed gap evacuation opening may be covered by the lamination layer and/or the further sheet. In further aspects of the present disclosure, an area may be cut out of the lamination layer to house a part of the seal of the sealed gap evacuation opening. This may e.g. help to protect the sealed gap evacuation opening.

In one or more aspects of the present disclosure, said lamination layer may be a Polyvinyl butyral (PVB) and/or an Ethylene Vinyl Acetate (EVA) layer. Such lamination materials may be especially relevant to use for VIG units for cooling or heating equipment such as freezers, refrigerators and/or household ovens, or for building aperture coverings such as windows or doors in outer walls or roof constructions of a building.

In one or more aspects of the present disclosure, said lamination layer may be a multi-layer lamination layer such as comprising layers providing different properties such as different optical properties.

In one or more aspects, the lamination layer may be a multi-layer lamination layer. The multilayer lamination layer may in one or more aspects of the present disclosure either be provided by a single, pre-bonded multi layered lamination layer to e.g. provide a fast lamination assembly preparation, and/or it may comprise lamination layers that are layered between the VIG and the further sheet when preparing the lamination assembly.

It is generally understood that the multi-layer lamination layer in one or more aspects of the present disclosure may be provided from a plurality of sheets of the same lamination material such as e.g. PVB or EVA, e.g. between 2 and 7 layers such as between 2-5 layers, such as between 3 and 5 layers of lamination material such as PVB or PVA. In further aspects of the present disclosure, the lamination layer may be a single layer lamination layer.

In one or more aspects of the present disclosure, said further sheet may be a glass sheet such as an annealed glass sheet. Annealed glass sheets may have a more plane surface structure, and may be cost efficient to use.

In one or more aspects of the present disclosure, said variation of the lamination layer thickness may be determined between neighbouring crests and valleys of the surface of the tempered glass sheet bonded to the lamination layer.

In one or more aspects of the present disclosure, said variation of the lamination layer thickness may be determined between two crests of the surface of the tempered glass sheet bonded to the lamination layer. In one or more aspects of the present disclosure, said two crests may be are separated by at least two such as at least three, such as at least five further crests in the surface. The crests may in further aspects be neighbouring crests.

The thickness variation may e.g. be provided due to more "global" surface variations of the thermally tempered glass sheet of the VIG unit, e.g. due to an inherent global variation in the tempered glass sheet, and/or due to stress conditions in the VIG unit. For example such surface variations may provide a part of the variation of the lamination layer thickness.

In one or more aspects of the present disclosure, said crests and/or valleys may be crests and/or valleys at least partly originating from roller waves provided during the thermal tempering process provided to thermally temper said thermally tempered glass sheets (11a, 11b). Thermally tempered glass sheets that may be cost efficient to use and are produced in large scales are often manufactured in a process where the glass sheets are transported on rollers in a roller conveyer system during the thermal tempering process. However, this process may cause roller waves in the thermally tempered glass sheets, which results in a surface variation above of 0.05 or more, and often above 0.1 or 0.2 mm. These roller waves may be "absorbed" by the lamination layer due to the lamination layer thickness and still provide a good lamination result. Some of the roller wave variation may though be evened out by the evacuation of the gap.

In one or more aspects of the present disclosure, said variation of the lamination layer thickness may be measured while the thermally tempered glass sheets of the vacuum insulated glass unit enclosing said gap have substantially the same temperature, such as within 5° C. or within 2° C. Hence, the glass sheets of the VIG unit may not thermally deflect substantially during the measurement.

In one or more aspects of the present disclosure, said thickness variation may be measured by means of an optical measurement solution. Said optical measurement solution may in one or more aspects be configured to provide an Ellipsometry measurement or a low-coherence interferometer measurement, such as a time-domain low-coherence interferometry measurement.

In one or more aspects of the present disclosure, said thickness variation (VAR) may be between 0.1 mm and 0.5 mm or between 0.2 mm and 0.4 mm.

In one or more aspects of the present disclosure, said lamination layer thickness may vary with no more than 0.4 mm such as no more than 0.3 mm over at least 90% such as at least 95% such as at least 98% of the surface of the thermally tempered glass sheet to which the lamination layer bonds.

At "artificial" recesses or holes such as evacuation opening areas of the glass sheet of the VIG unit, or at or near any recesses or holes in the further sheet, the thickness variation may though be larger.

The present disclosure, in a second aspect, additionally relates to use of a method for providing laminated vacuum insulated glass (VIG) units according to any of claims 1-15, wherein said method comprises:
providing a lamination assembly comprising
a vacuum insulated glass (VIG) unit comprising at least two, tempered glass sheets separated by a plurality of support structures distributed in a gap between the tempered glass sheets, and
a lamination layer arranged between one of the tempered glass sheets of the vacuum insulated glass (VIG) unit and a further sheet,
arranging the lamination assembly between clamping bodies providing clamping surfaces, wherein at least one of said clamping surfaces is configured to be displaced by one or more clamping body displacers to change the distance between the clamping surfaces, and
operating the clamping body displacers to provide a compression pressure to the lamination assembly by means of the clamping surfaces, and
heating the lamination assembly.

Heating and providing a compression pressure may help to provide a fast and controlled manufacturing solution for laminating VIG units, which may fit larger scale VIG unit manufacturing capacity demands. Additionally, it may help to provide a lamination solution providing an improved yield of Laminated VIG units having a high lamination quality.

Additionally, providing a compression pressure to the lamination assembly may help to provide a sufficient lamination for VIG units comprising tempered glass sheets, as the compression pressure may force the outer major surface of the tempered glass sheet of the VIG unit facing the lamination layer into the heated and thus softened lamination layer. This may help to remove surface roughness in the lamination layer and/or causes the lamination layer to adapt to possible surface variations in the outer major surface of the tempered glass sheet facing the lamination layer, and thus may help to provide a sufficient bonding to the VIG unit.

The gap between the tempered glass sheets of the VIG unit may have been evacuated and sealed prior to providing said compression pressure during the lamination of the VIG unit.

The tempered glass sheets may provide e.g. an advantage of improved structural strength of the VIG, which may help to provide a solution wherein support structures such as pillars may be arranged with larger mutual distance in the gap between the glass sheets of the VIG unit, thereby reducing the number of potential "cold bridges" in the VIG unit per selected surface area unit, e.g. per $m^2$ VIG unit surface.

It is generally understood that the further sheet may be a glass sheet such as an annealed glass sheet or a tempered glass sheet.

Operating the clamping body displacers to provide a compression pressure to the lamination assembly by means of the clamping surfaces, and heating the lamination assembly may in embodiments of the present disclosure be referred to as a heating step.

In one or more aspects of the second aspect, said compression pressure is provided simultaneously with said heating of the lamination assembly.

For example, the compression pressure may be provided while the heating arrangement(s) for heating the lamination assembly is turned on. This may e.g. help to provide a faster lamination process. In embodiments of the present disclosure, an initial heating of the lamination layer and further sheet by means of a heating arrangement may be provided, for example by conduction heating while the lamination assembly is arranged in between the clamping bodies may be provided before the compression pressure is applied, and the heating may then be continued while the compression pressure is present.

In one or more aspects of the second aspect, the compression pressure applied to the lamination assembly is between 1.5 and 3.5 Newton/cm$^2$, for example between 2 and 3 Newton/cm$^2$, such as between 2.4 and 2.8 Newton/cm$^2$ This may help to provide a faster lamination and also handle potential bending of the lamination assembly during the heating step. The compression pressure may also (together with a sufficient heating of the lamination layer) even out surface roughness at the lamination layer with a reduced risk of damaging the VIG unit.

In one or more aspects of the second aspect, one or both of said clamping surfaces is/are provided by rigid clamping bodies configured to be displaced by one or more clamping body displacers such as mechanical clamping body displacers, such as one or more linear actuators.

This may e.g. help to provide a fast lamination process. Alternatively or additionally, it may provide a reliable and more controllable solution for adjusting the compression pressure, and/or may improve manufacturing accuracy for manufacturing laminated VIGs.

In one or more aspects of the second aspect, a resilient layer, such as a resilient mat, is arranged between a major surface of the lamination assembly and one or both of said clamping surfaces.

The resilient layer may provide a force distribution of the compression pressure and/or spare the major surface of the lamination assembly while the compression pressure is applied. Also or alternatively, the resilient layer, such as a silicon or rubber mat, may help to provide an improved contact between the lamination assembly's outer major surface(s) and the heating arrangement used for heating and softening the lamination layer. The VIG unit may initially, without even providing a temperature difference between the VIG unit glass sheets, be subjected to an initial bending/deflection which may provide poor or even no heating at certain points of the VIG unit if the resilient layer is not present.

Also or alternatively, the VIG unit may be subjected to thermal deflection caused by a temperature difference between the VIG unit glass sheets, This thermal deflection may occur due to the good insulation properties provided by the evacuated gap, and that a rigid edge seal encloses the gap between the VIG units. This thermal deflection may cause a poor lamination quality and/or a poor control of the VIG unit deflection at certain areas of the VIG unit during the heating and pressing. The resilient layer may however help to solve or reduce issues occurring due to a deflection or unevenness of the VIG unit.

For example, a resilient layer, such as a mat, may be arranged between the outer major surface of the lamination assembly facing away from the lamination layer and a proximate clamping surface, and/or between the surface of the further sheet facing away from the lamination layer and a proximate clamping surface.

In one or more aspects of the second aspect, a controlled cooling is provided by means of a cooling system subsequent said heating so as to harden said heated lamination layer.

In one or more aspects of the second aspect, the lamination assembly may be arranged in a vacuum enclosure and subjected to an evacuation step in the vacuum enclosure, such as prior to and/or during applying said compression pressure and/or said heating.

Generally, in one or more aspects of the present disclosure one, the heating of for example the major surface facing away from the further sheet may be provide by means of a convection heating such as a forced convection heating and/or by means of radiation heating. Though, a clamping pressure may also be provided to the lamination assembly's outer major surfaces and provide a conduction heating in connection therewith.

The present disclosure additionally in a third aspect relates to use of a system for providing laminated vacuum insulated glass (VIG) units according to any of claims 1-15, wherein the laminated vacuum insulated glass units comprises a vacuum insulated glass unit comprising at least two, glass sheets separated by a plurality of support structures distributed in a gap between the glass sheets, and a lamination layer arranged between one of the glass sheets of the vacuum insulated glass (VIG) unit and a further sheet, wherein the system comprises
clamping bodies providing clamping surfaces, wherein at least one of said clamping surfaces is configured to be displaced by one or more clamping body displacers to change the distance between the clamping surfaces,
a controller is configured to control said one or more clamping body displacers to provide a compression pressure to a lamination assembly by the clamping surfaces, and
a heating arrangement configured to heat said clamping surfaces so as to heat major outer surfaces of a lamination assembly while pressed towards said surfaces.

FIGURES

Figure 2:
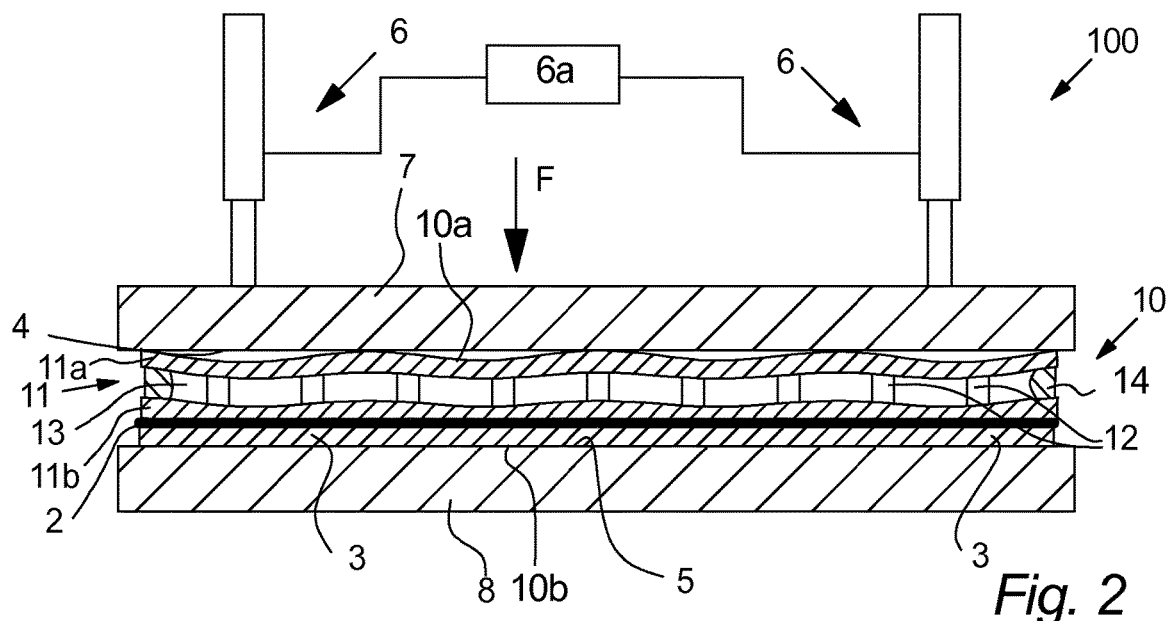
Figure 3:
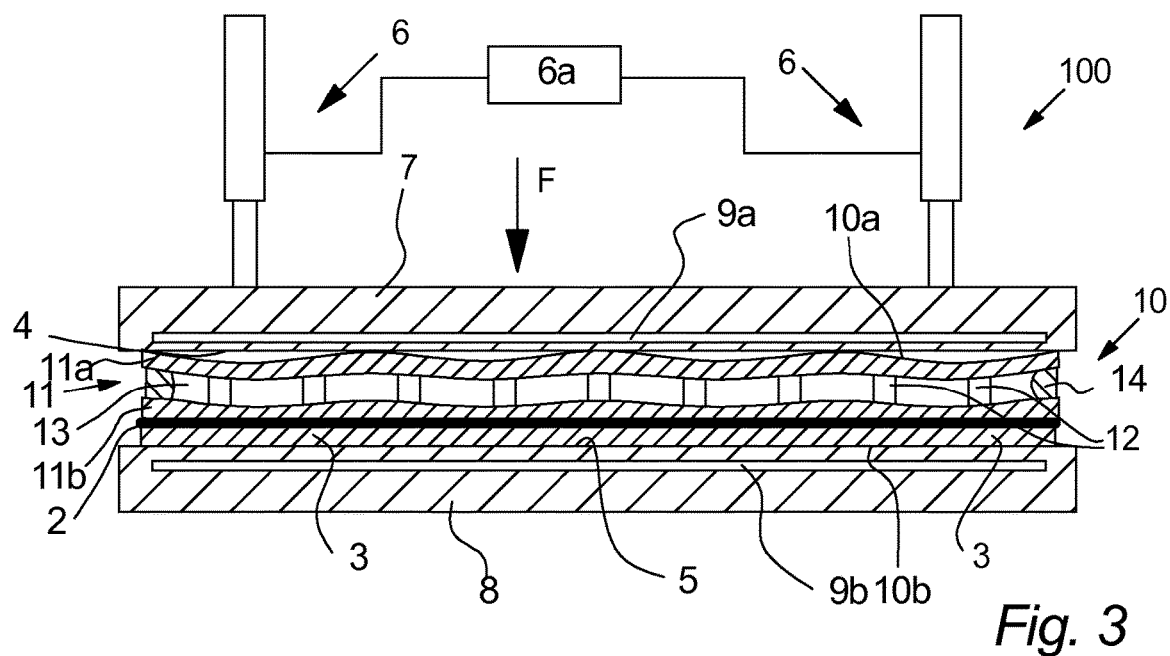
Figure 4:
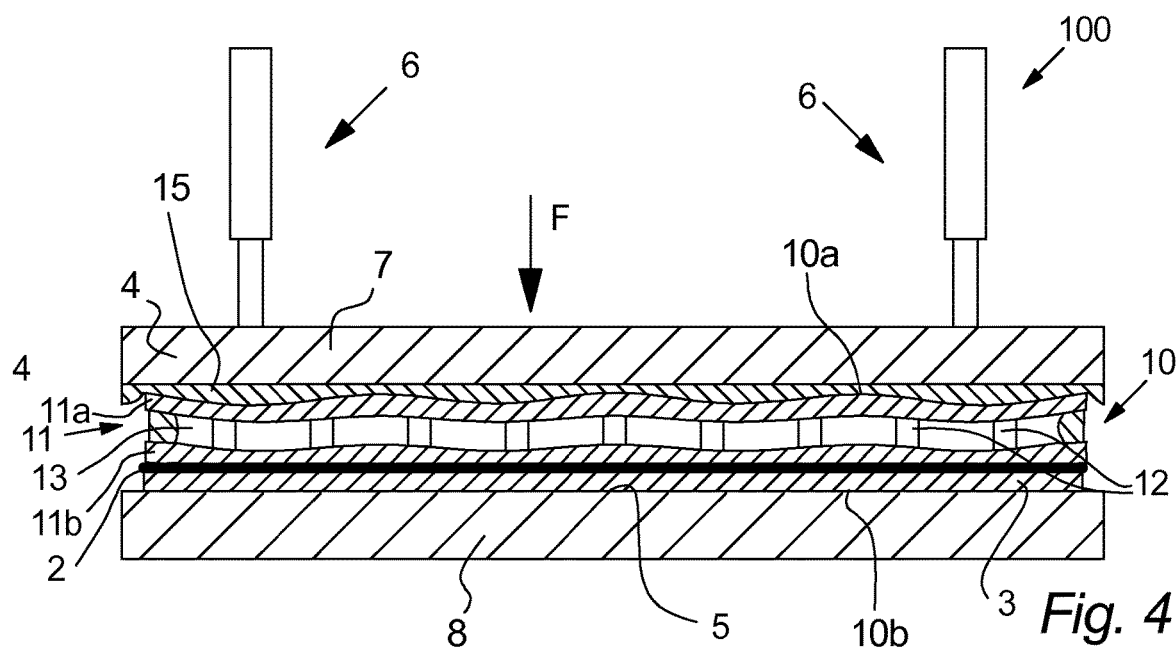
Figure 5:
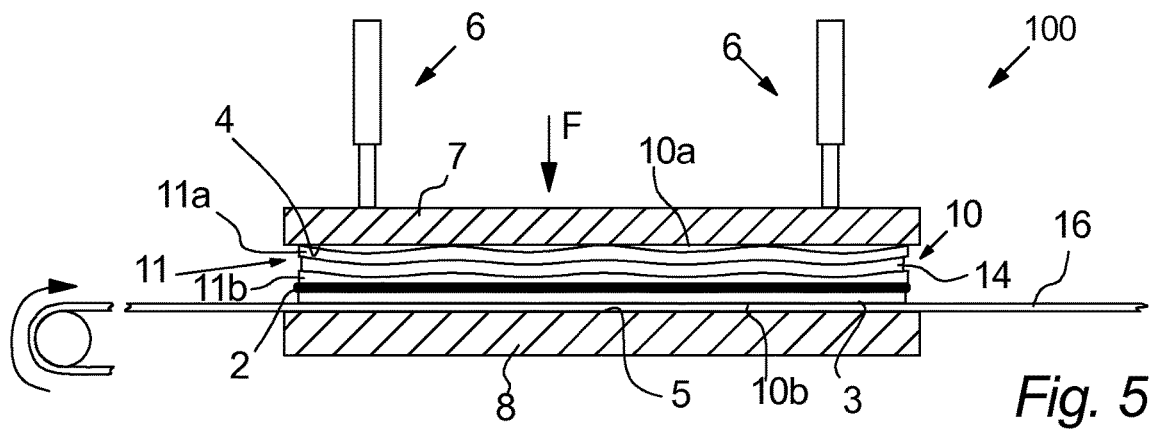
Figure 6:
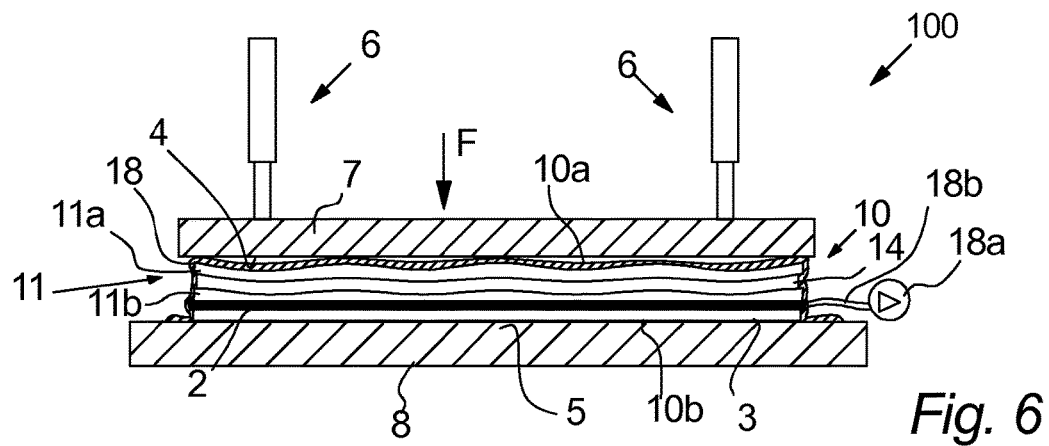
Figure 11:
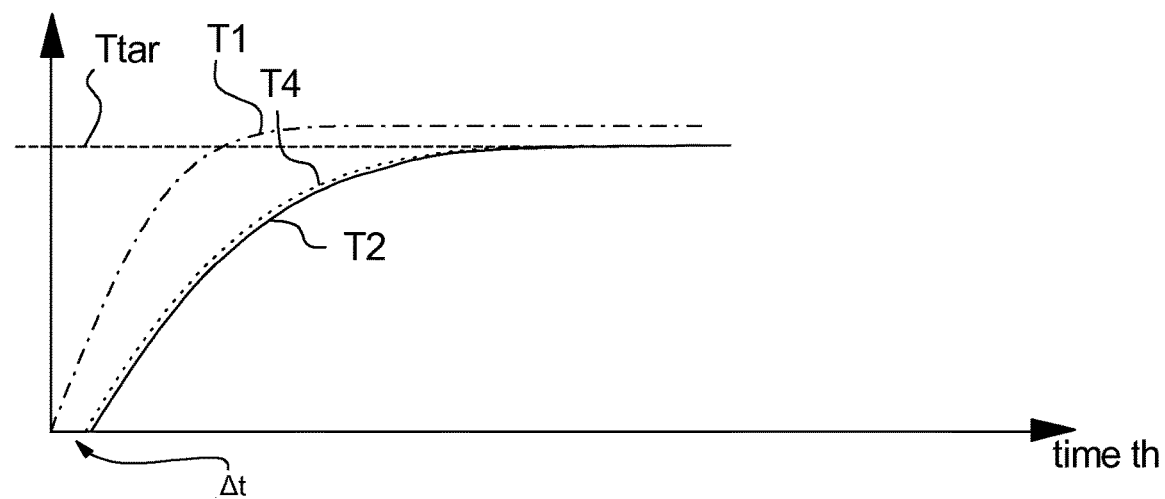
Figure 12:
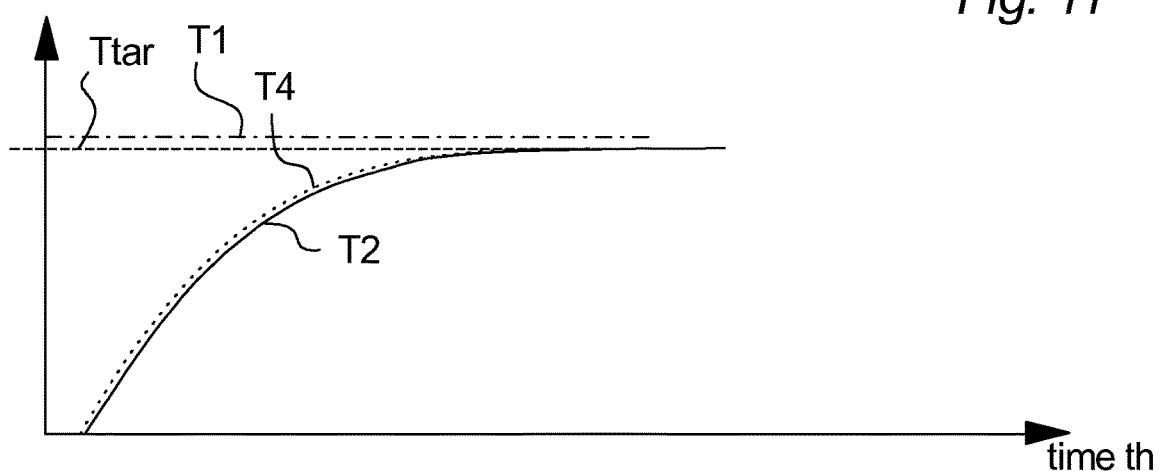
Figure 13:
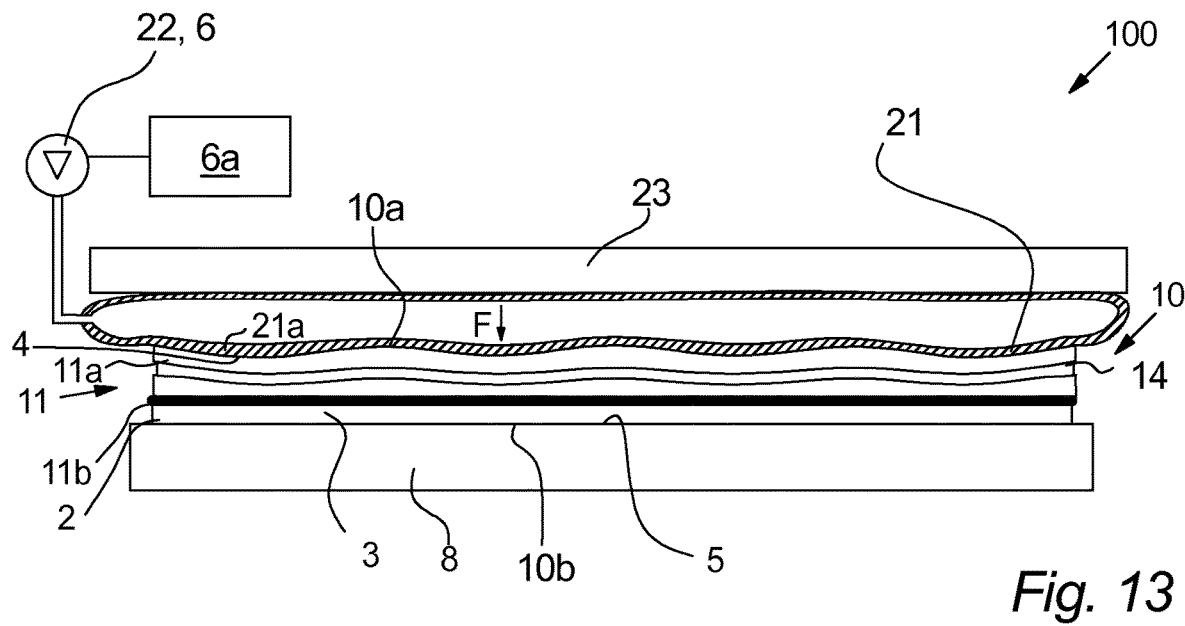
Figure 13A:
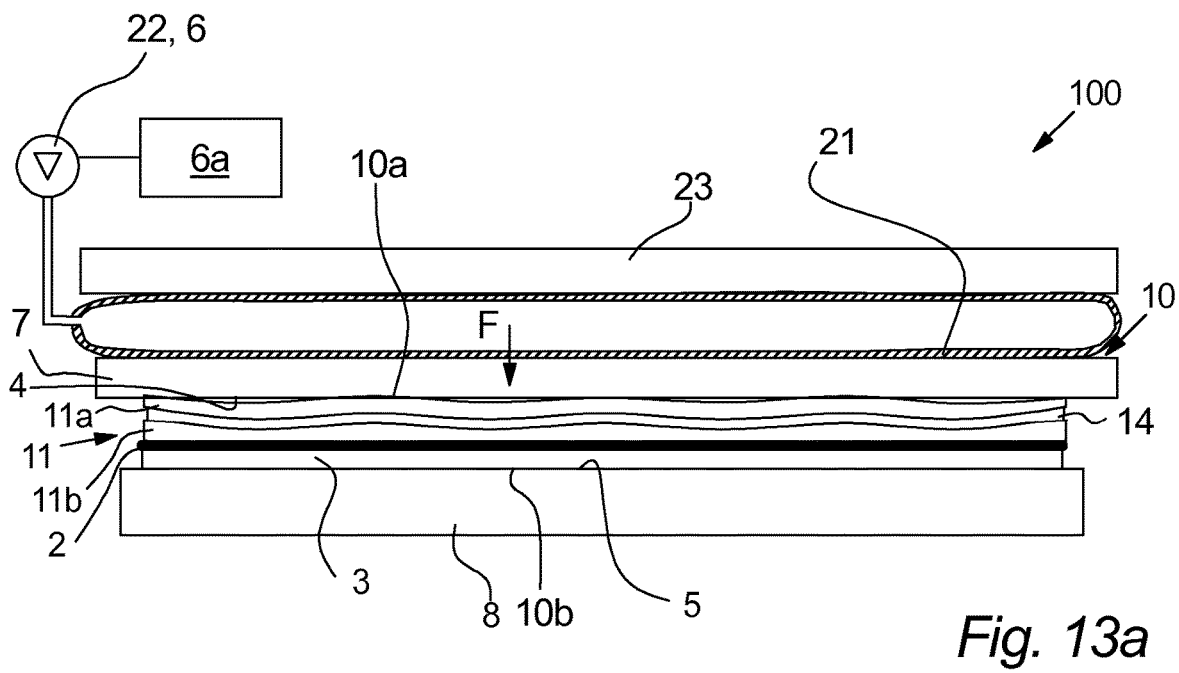
Figure 14:
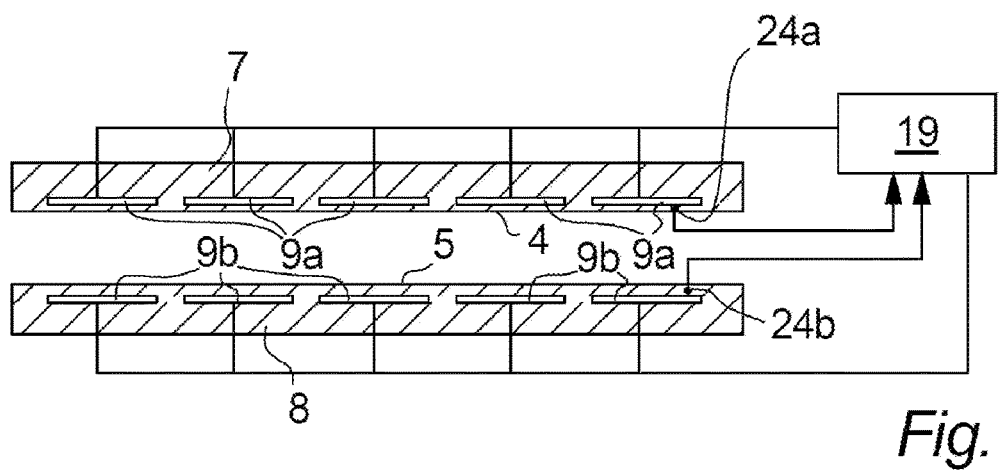
Figure 15:
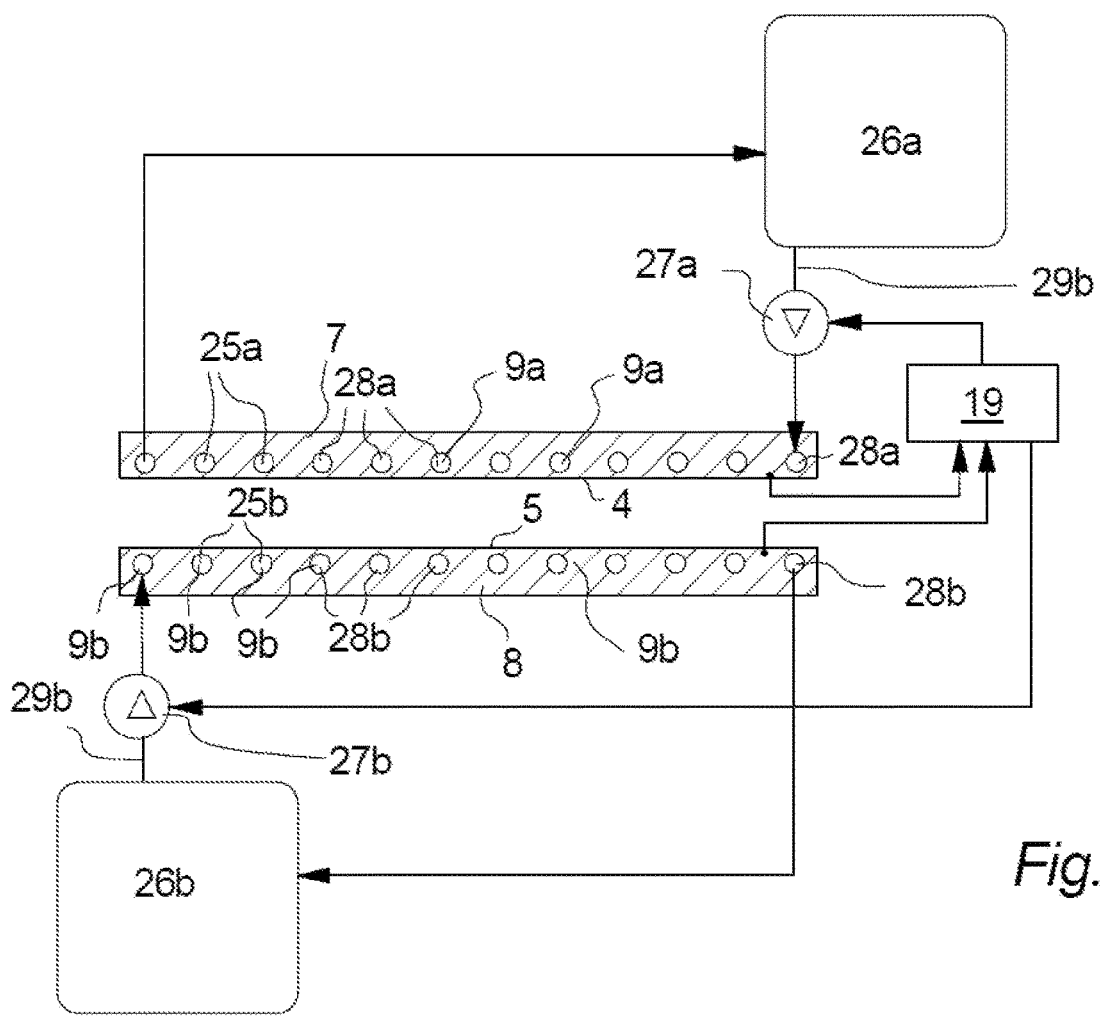
Figure 16A:
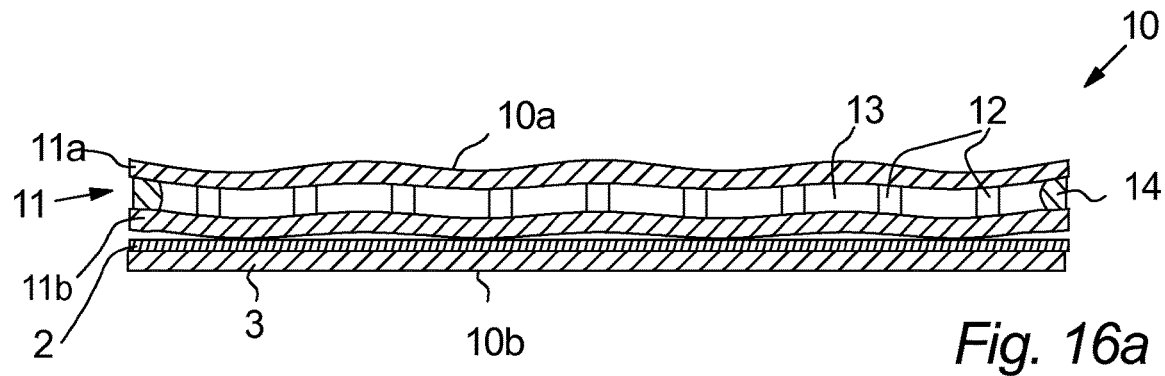
Figure 16B:
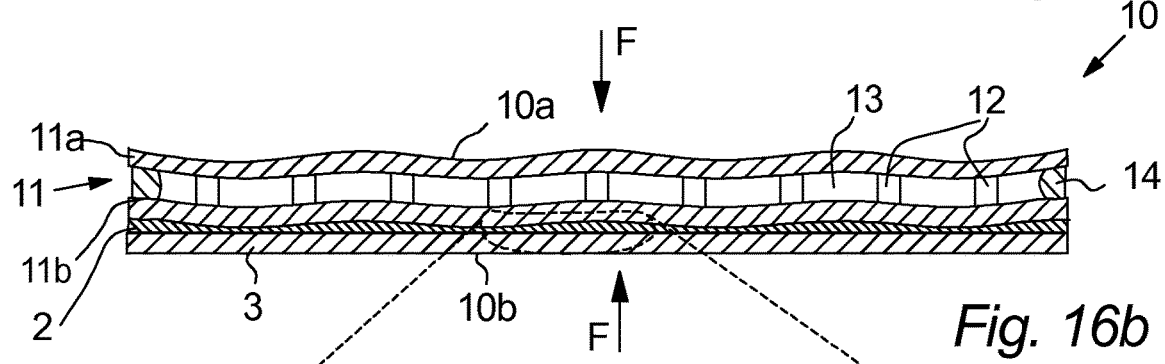
Figure 17A:
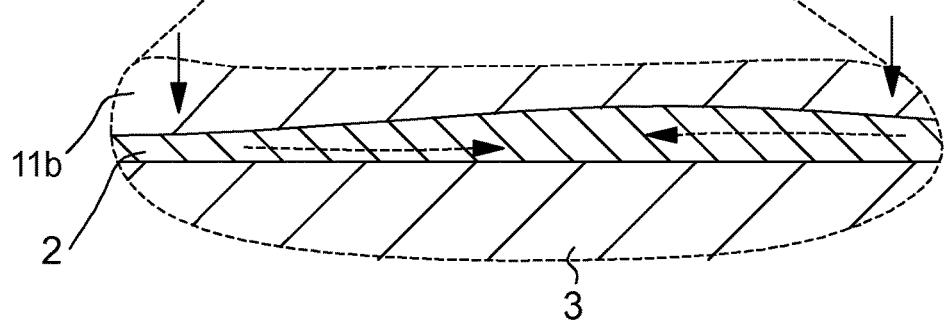
Figure 17A:
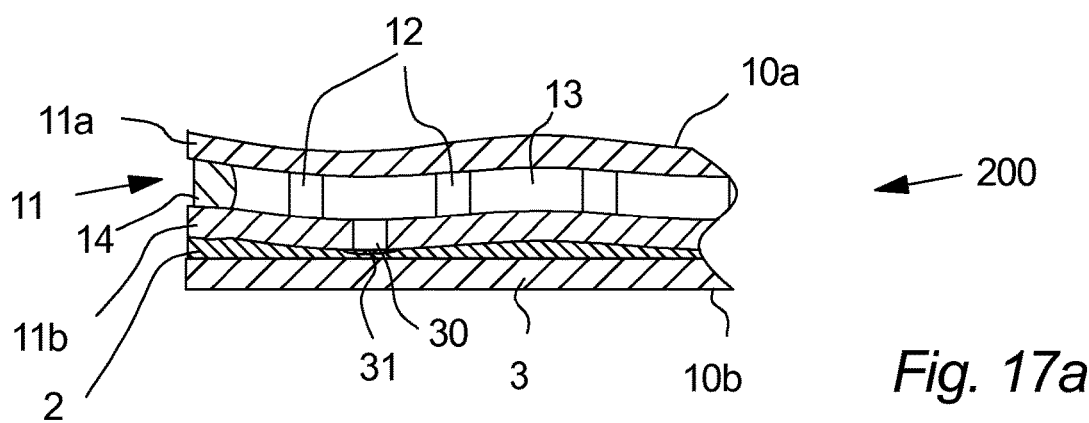
Figure 17B:
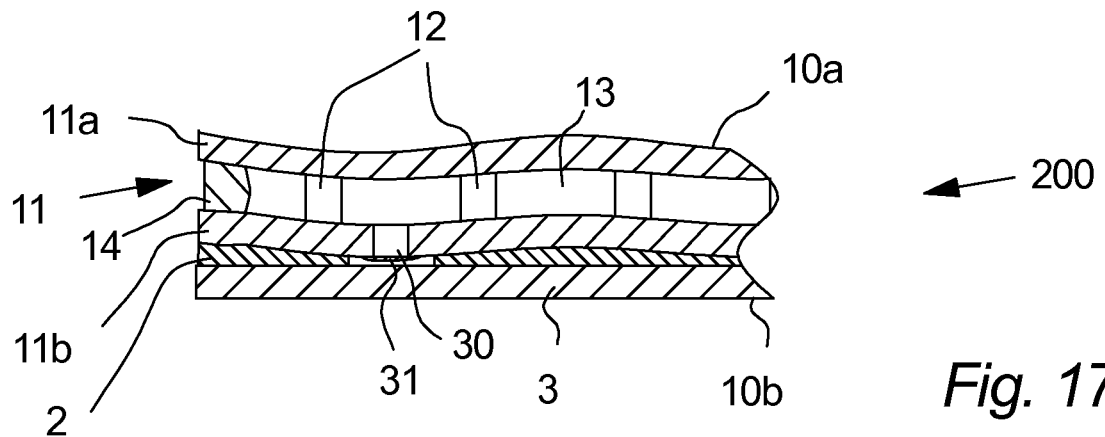
Figure 17C:
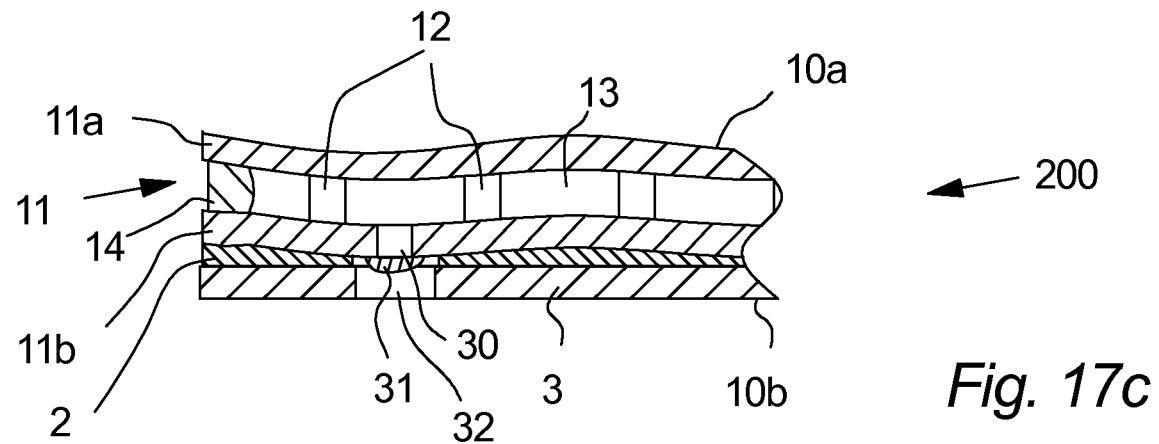
Figure 17D:
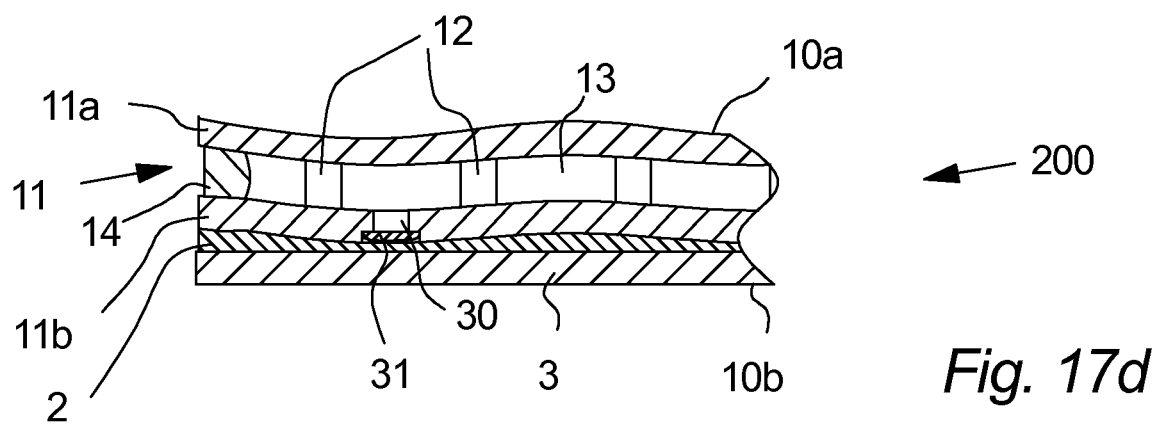
Figure 18:
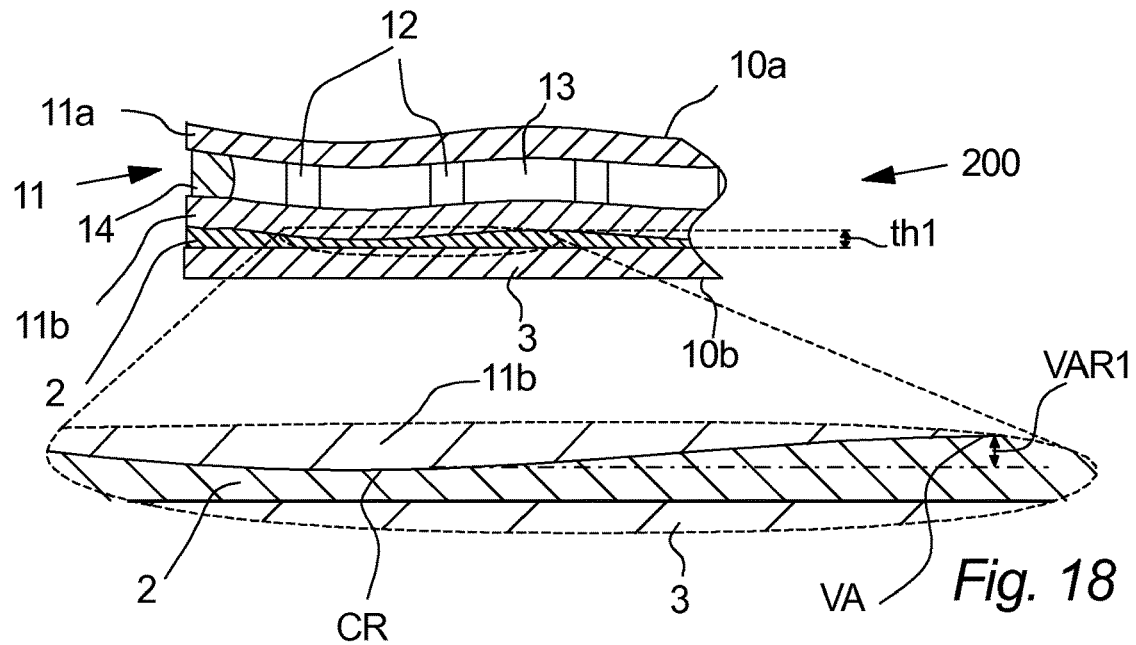
Figure 18A:
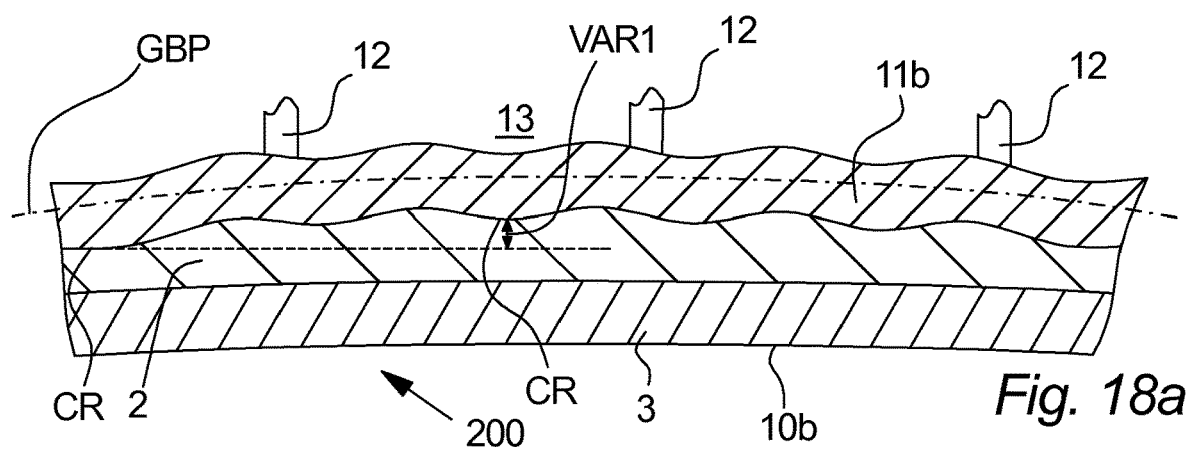
Figure 19:
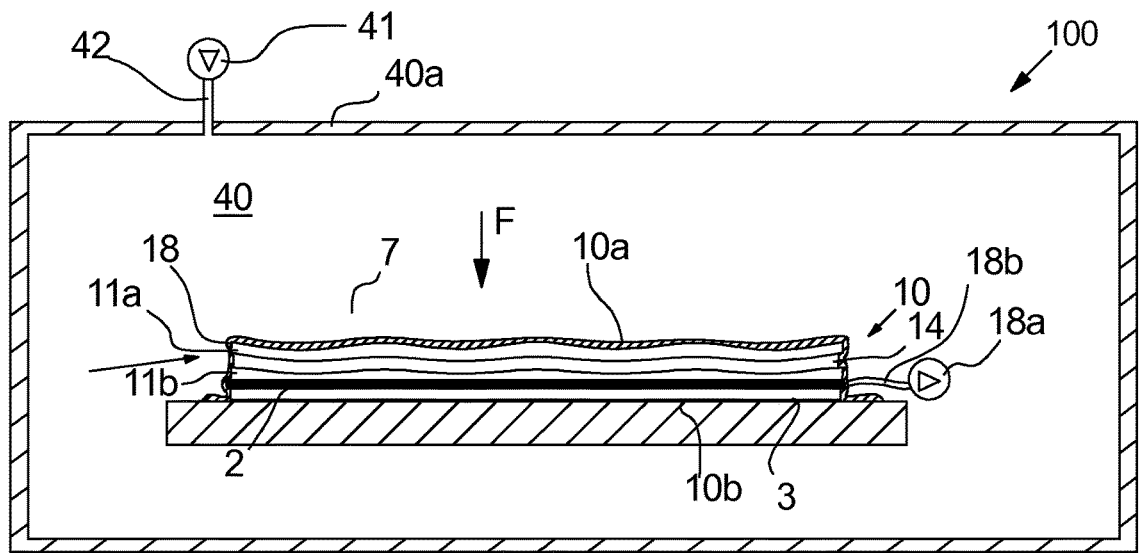
Figure 20:
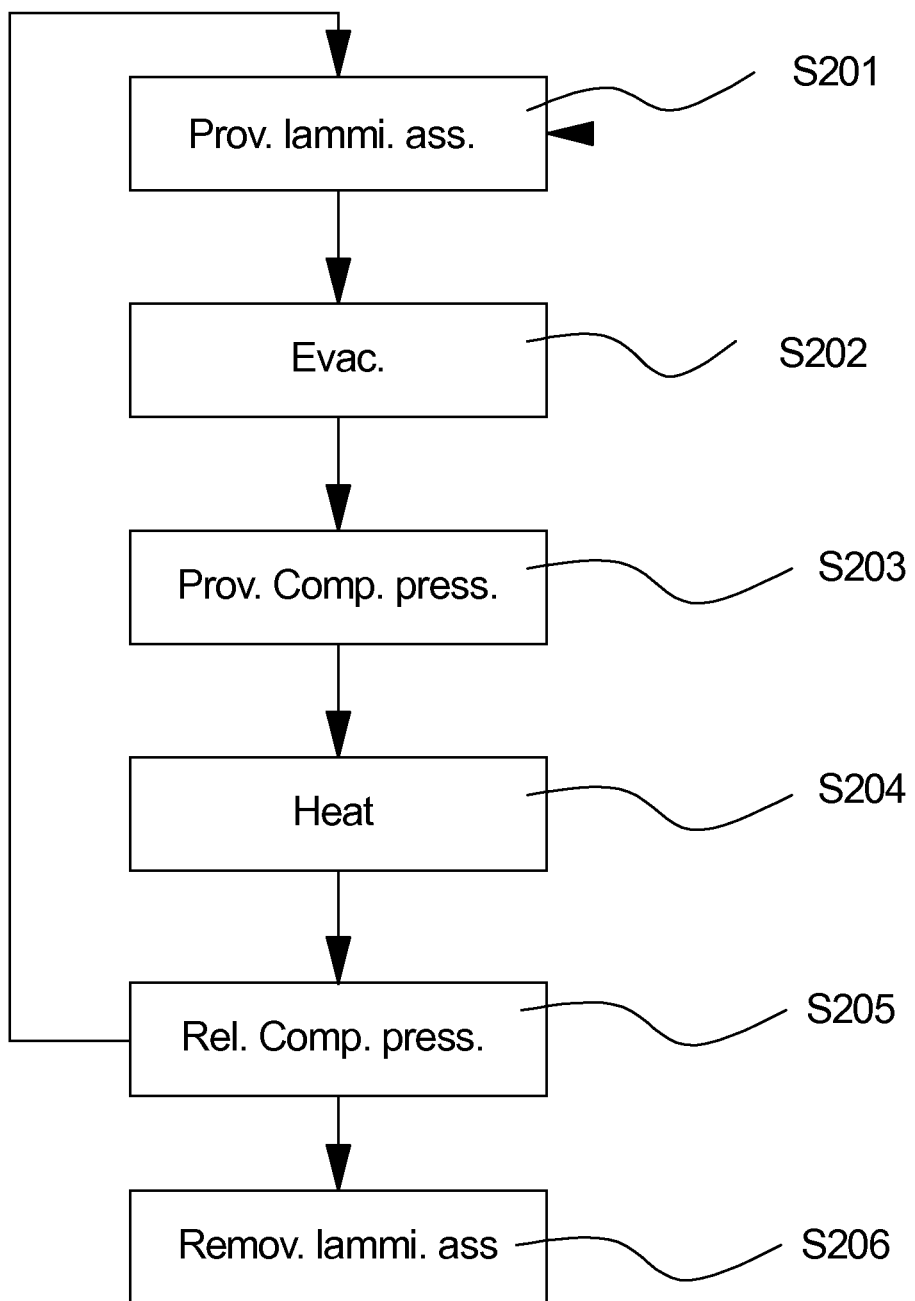
Figure 21:
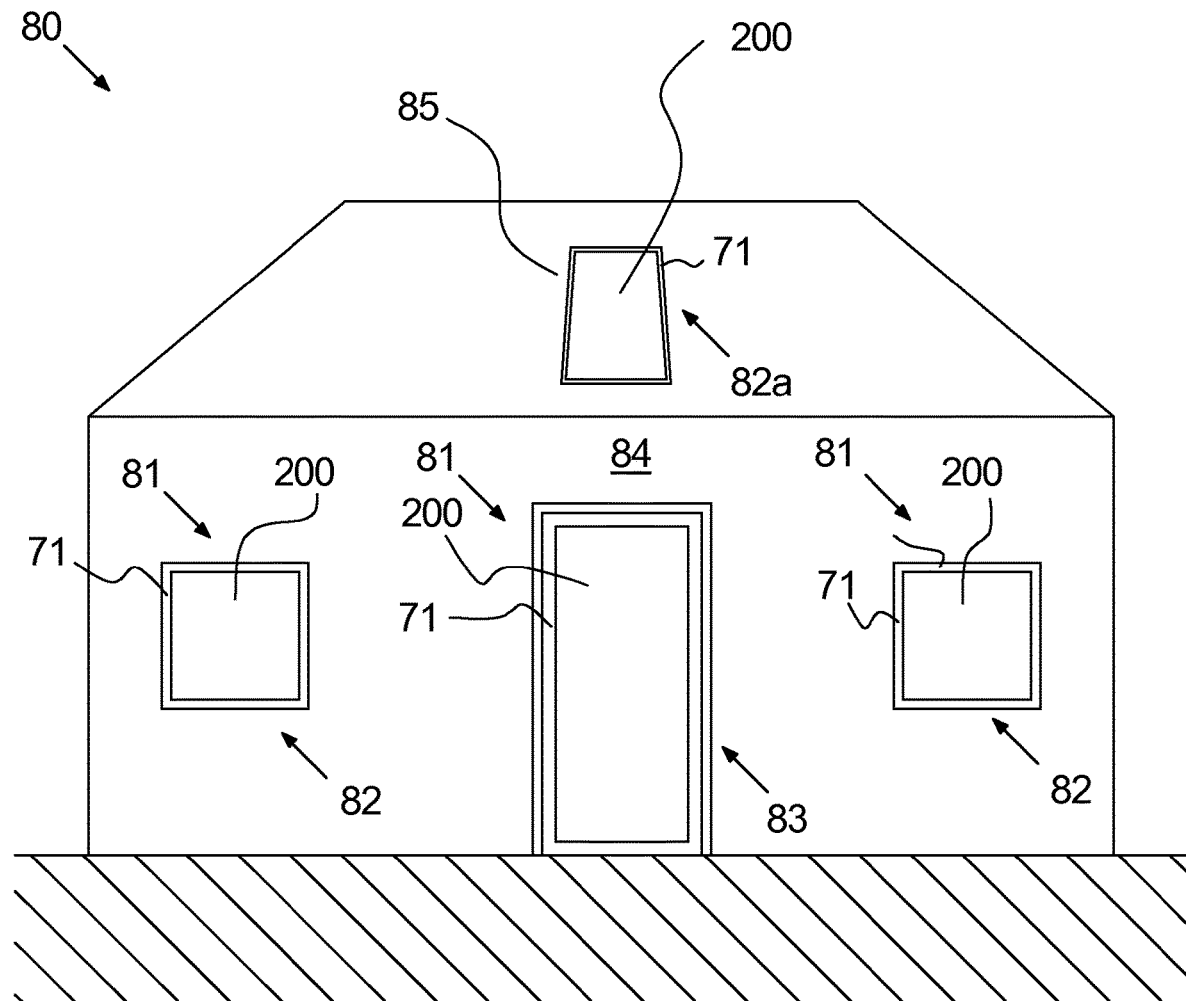
Figure 22:
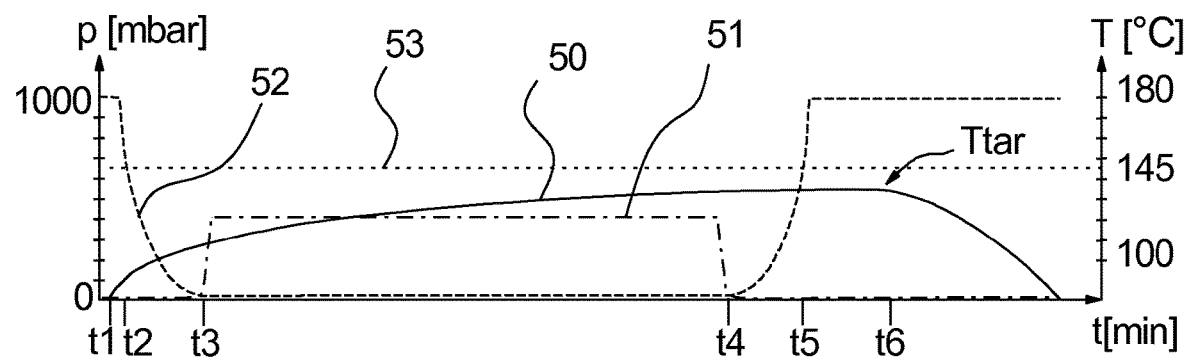
Figure 23:
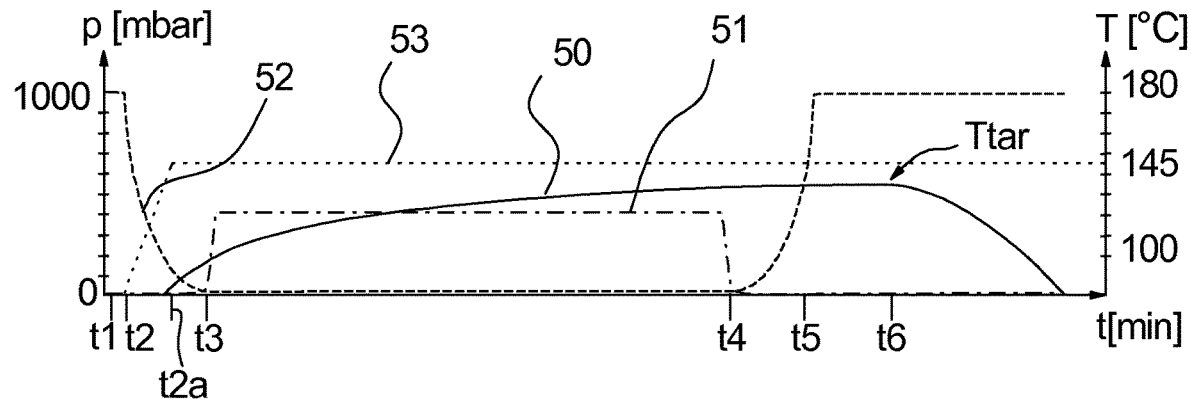
Figure 24:
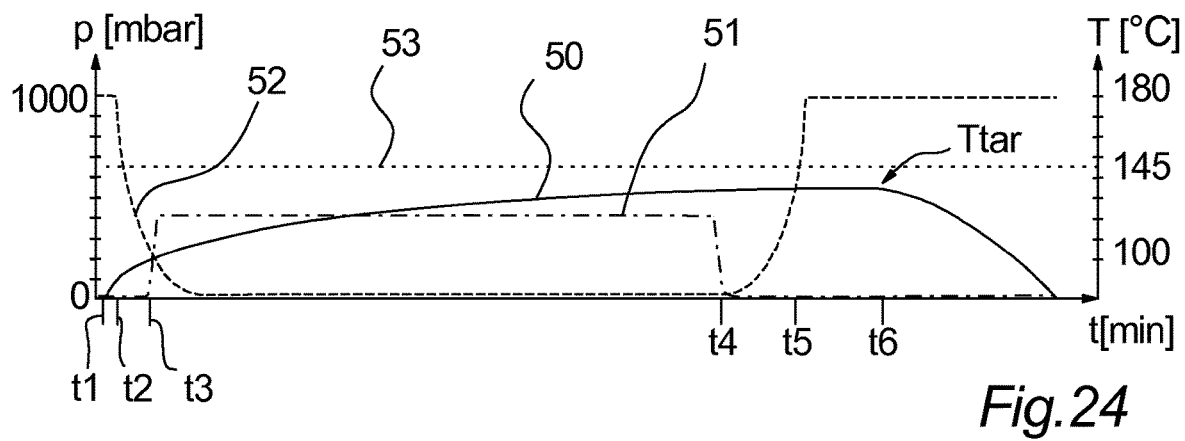
Figure 25:
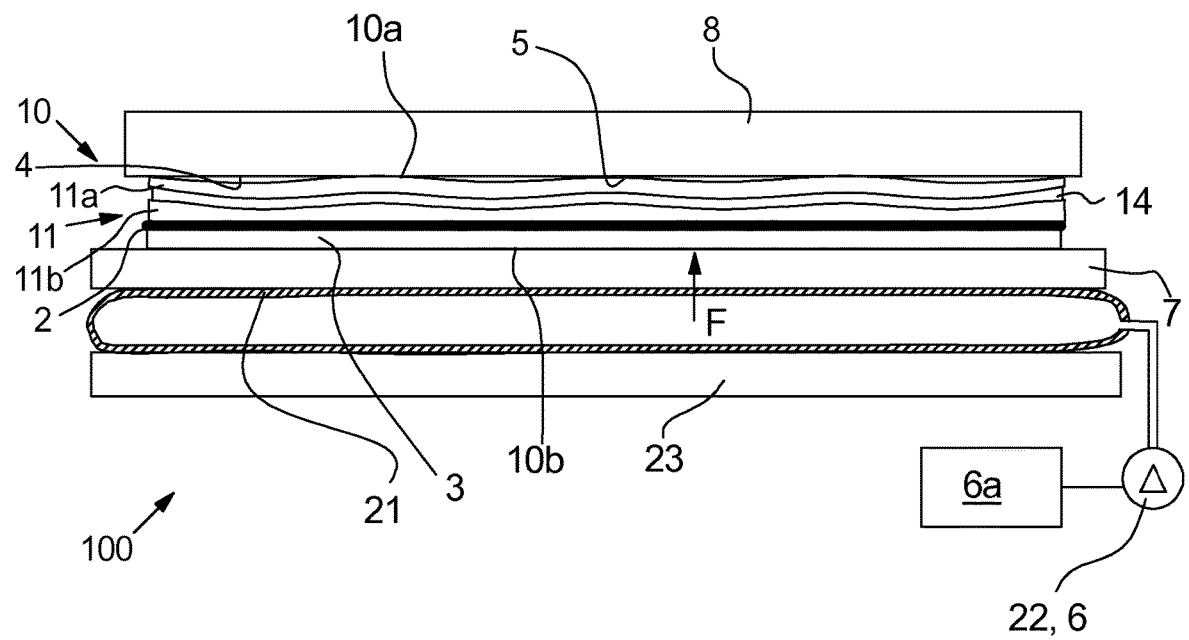
Figure 26:
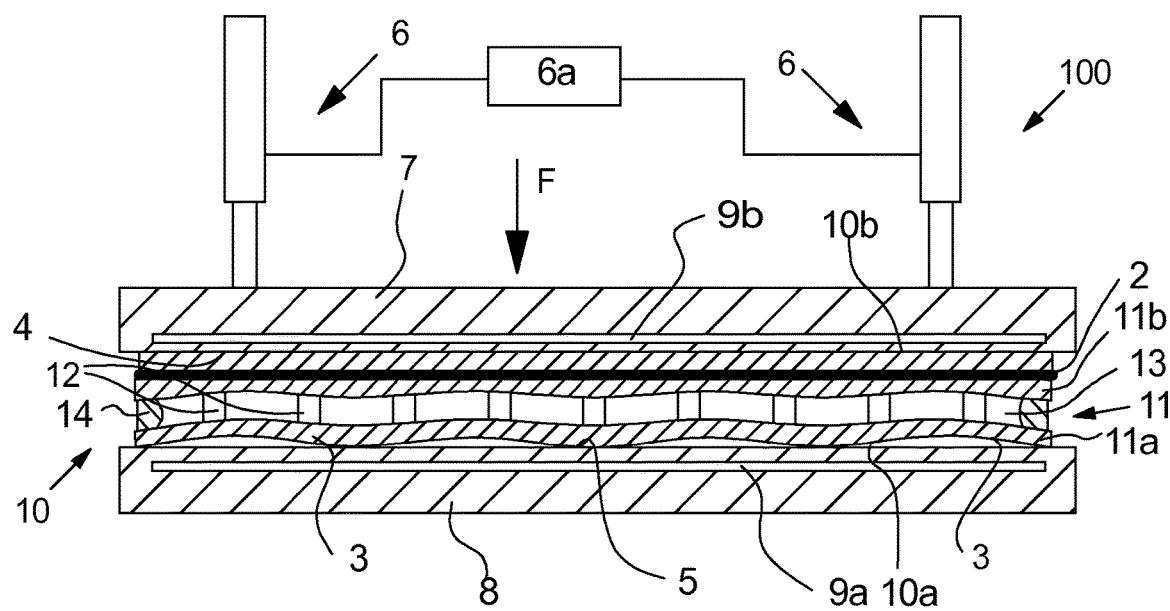
Figure 27:
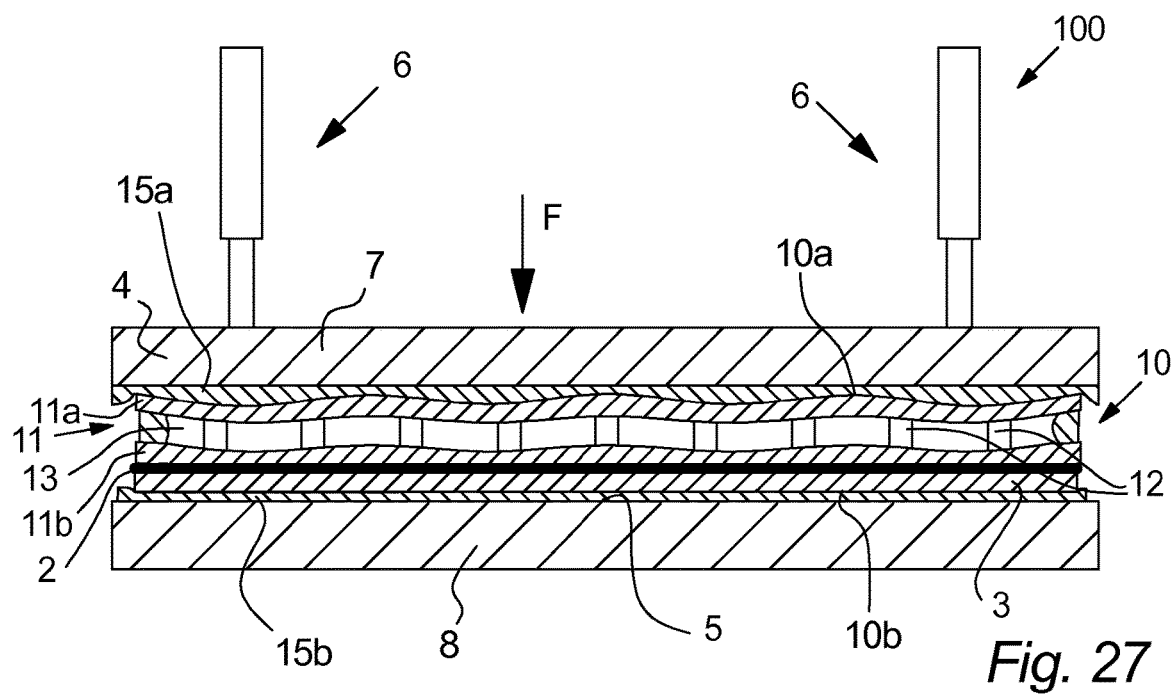
Figure 27A:
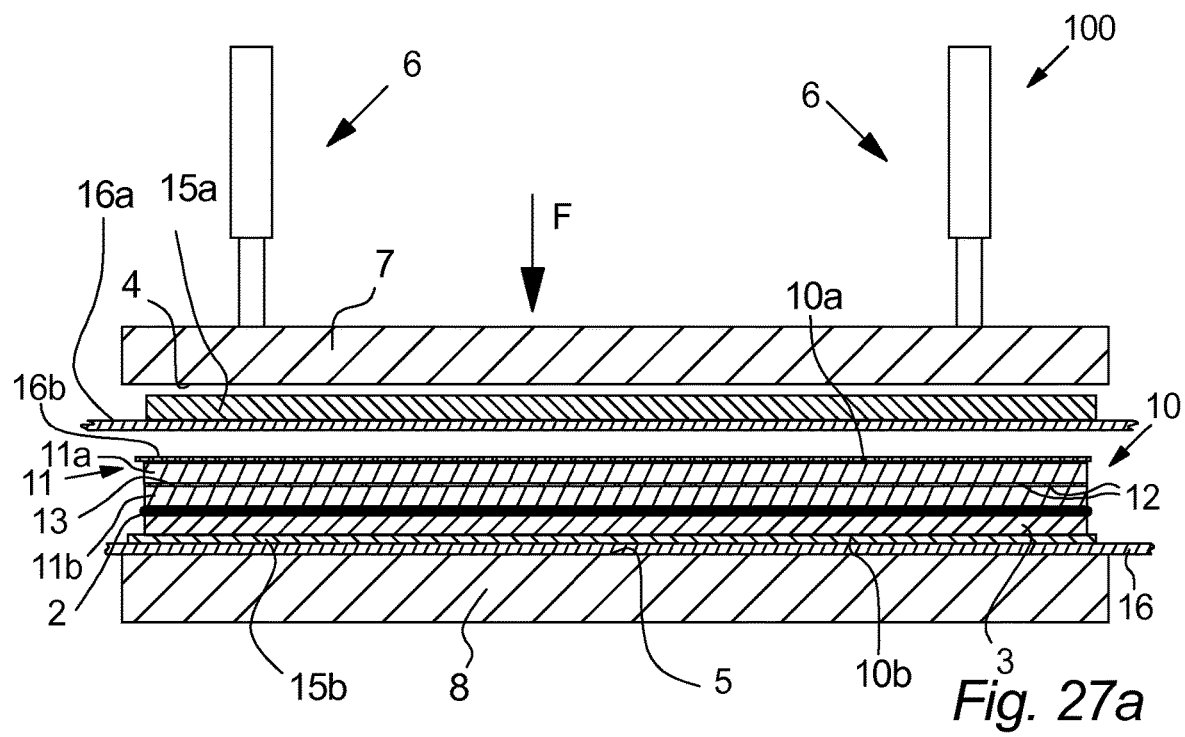
Figure 27B:
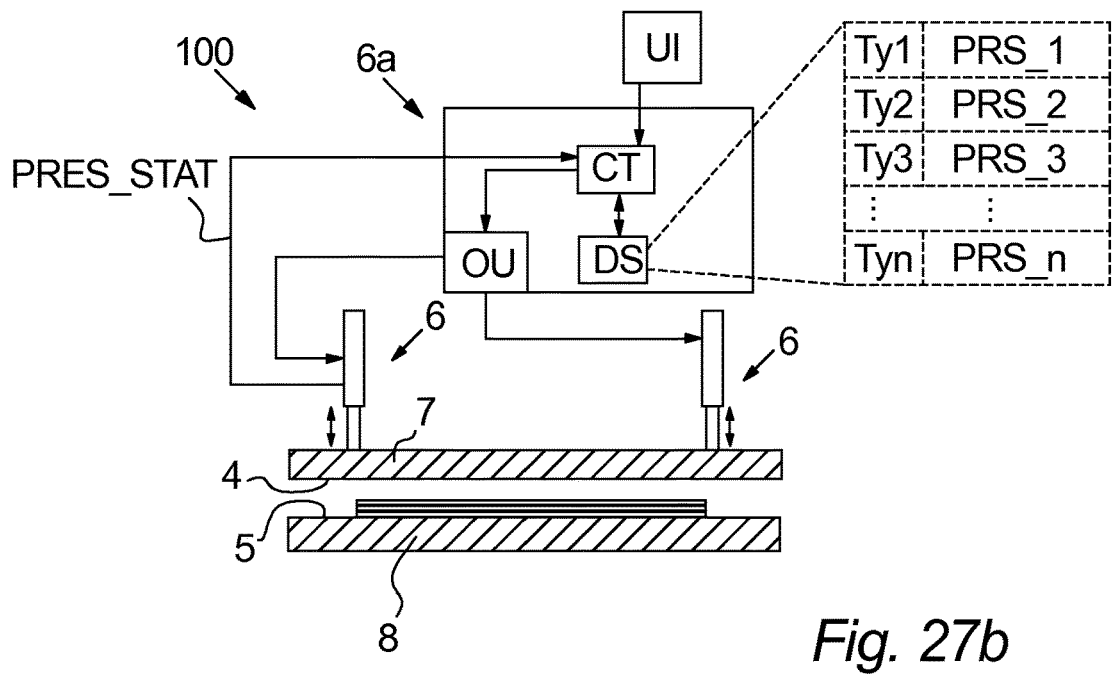
Figure 28:
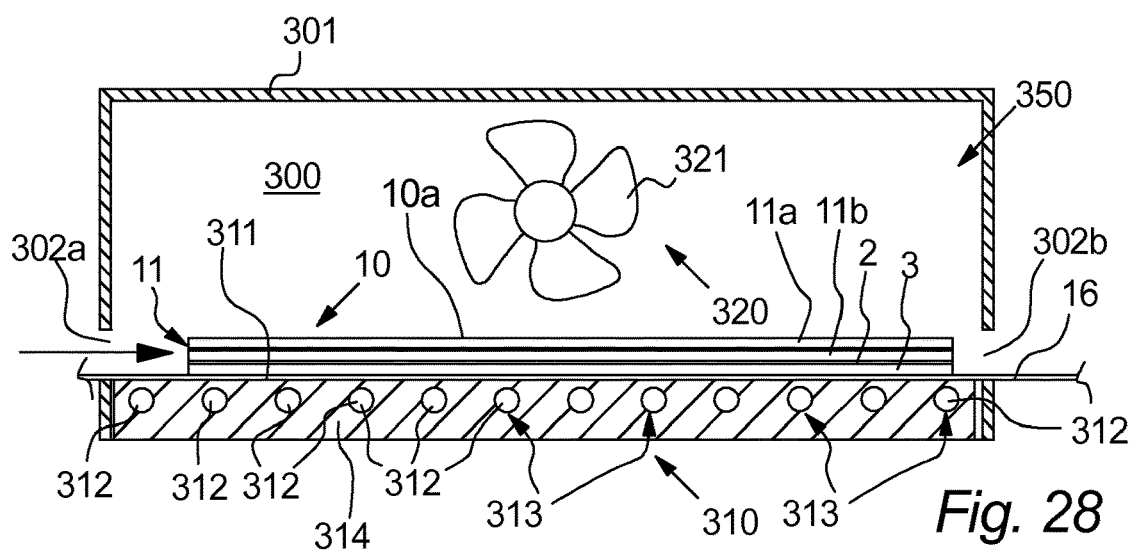
Figure 29:
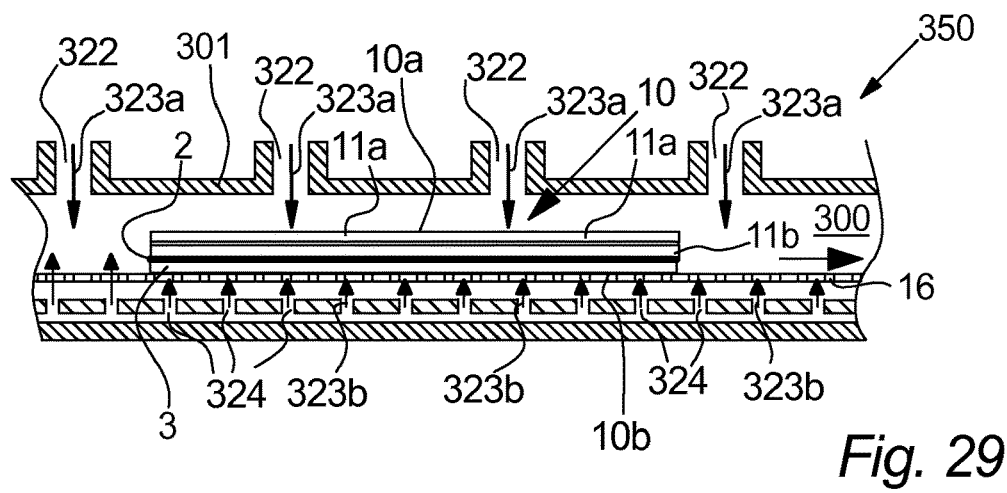
Figure 30:
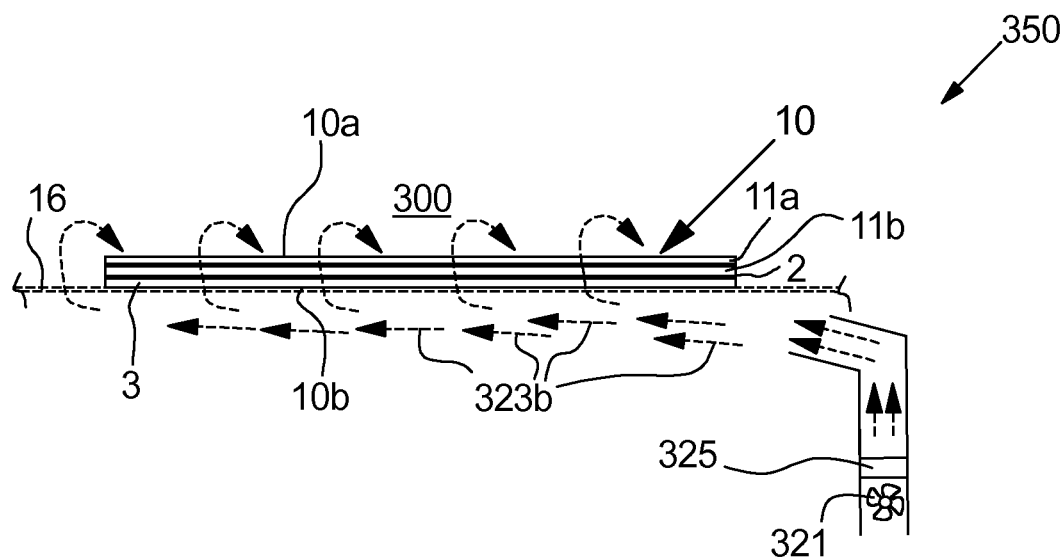
Figure 31:
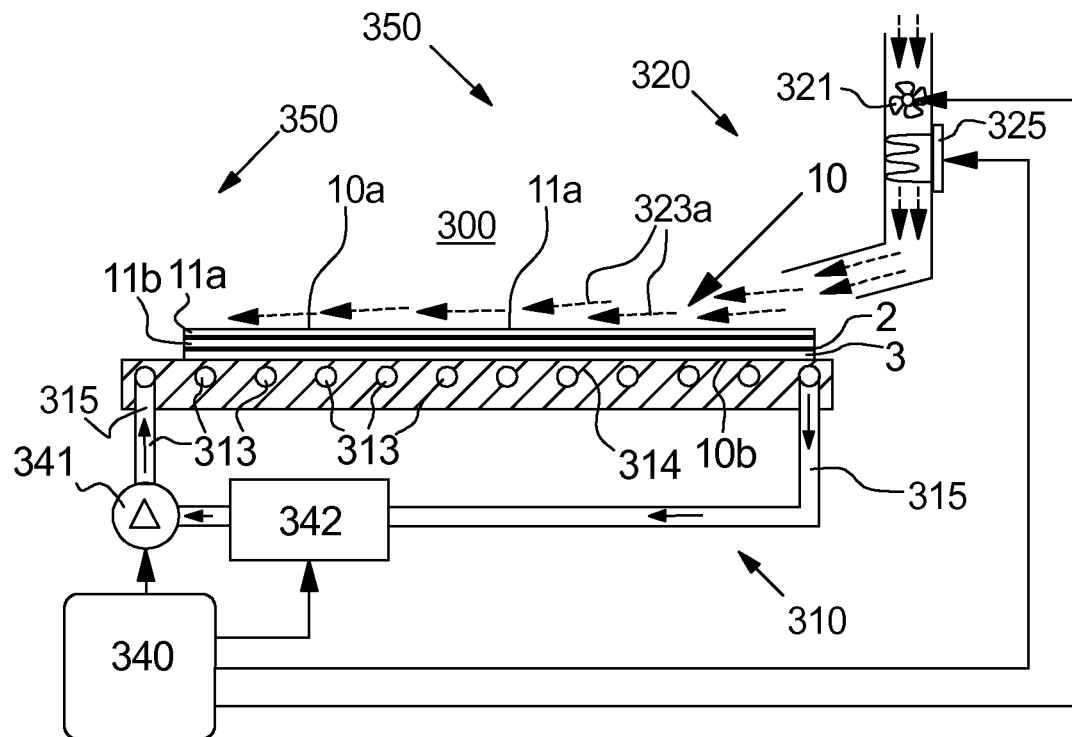
Figure 32:
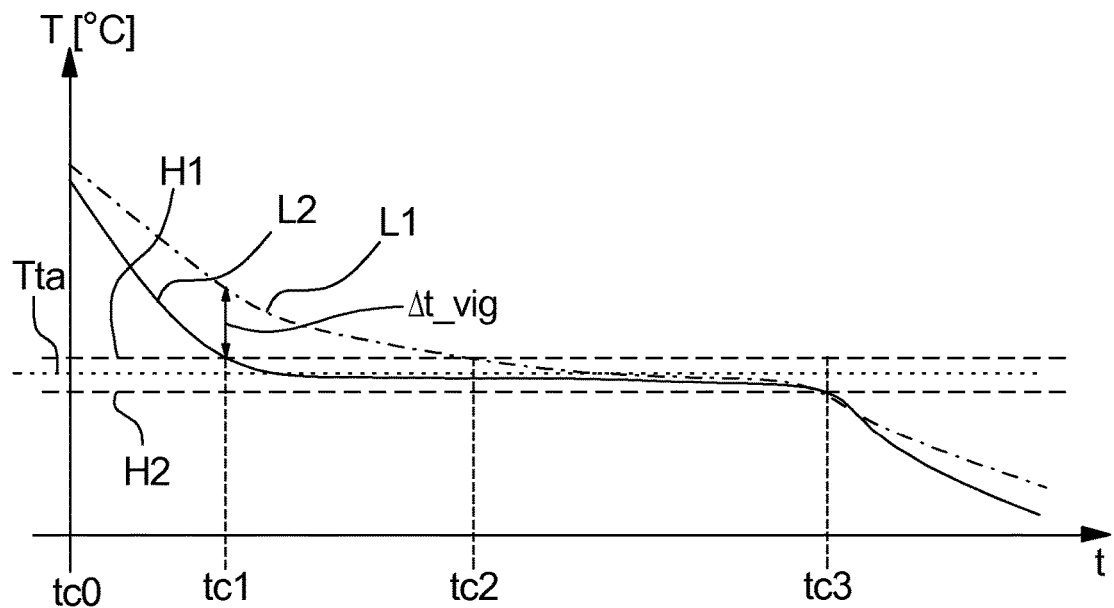
Figure 33:
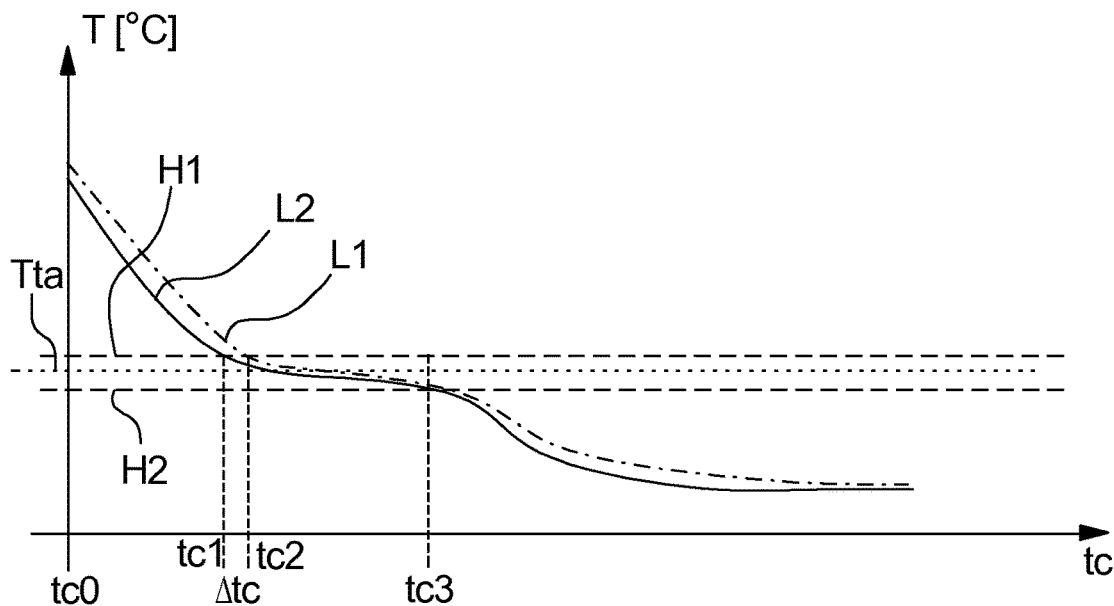
Figure 34:
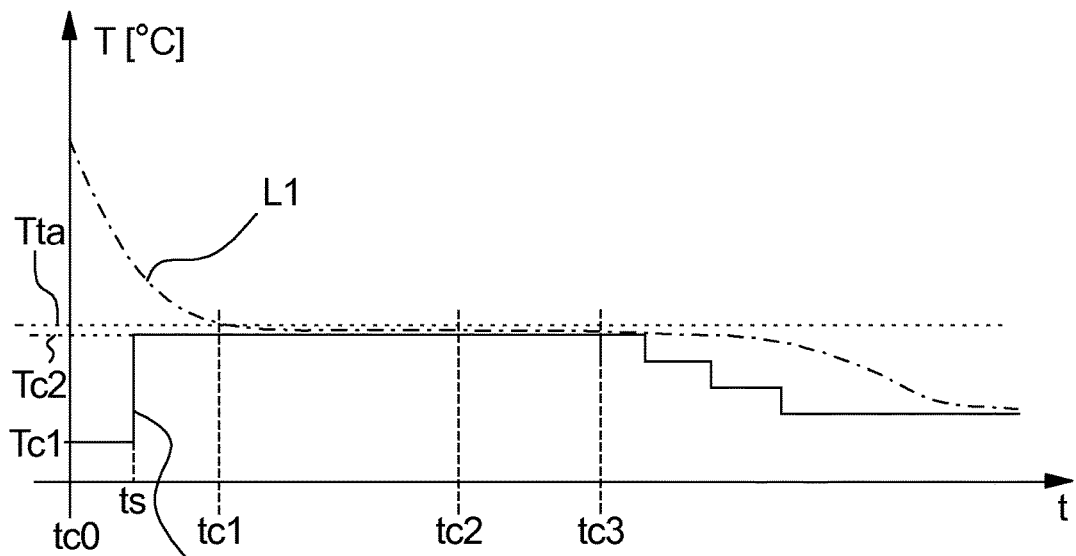
Figure 35:
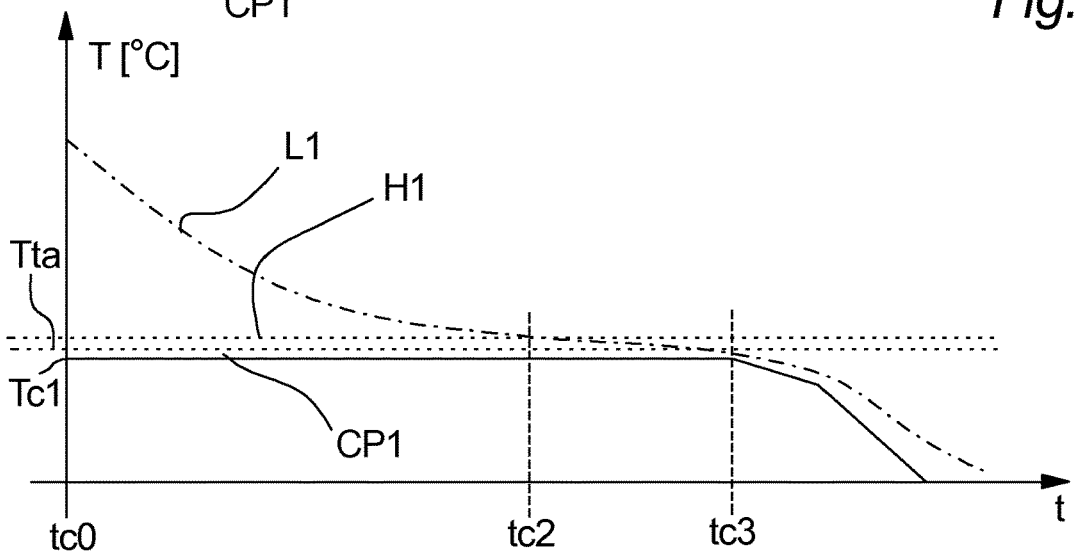
Figure 36:
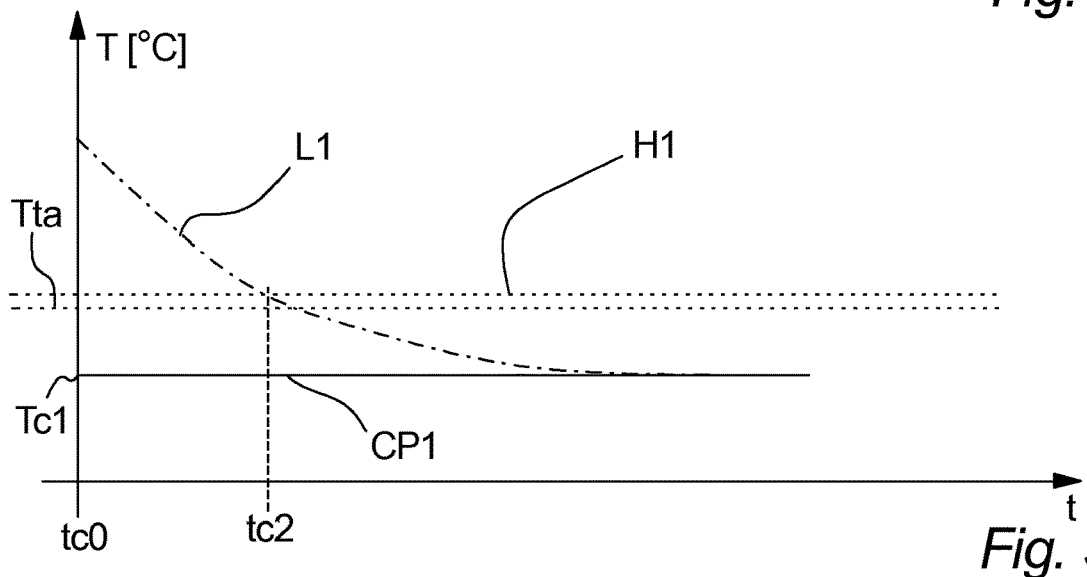
Figure 37:
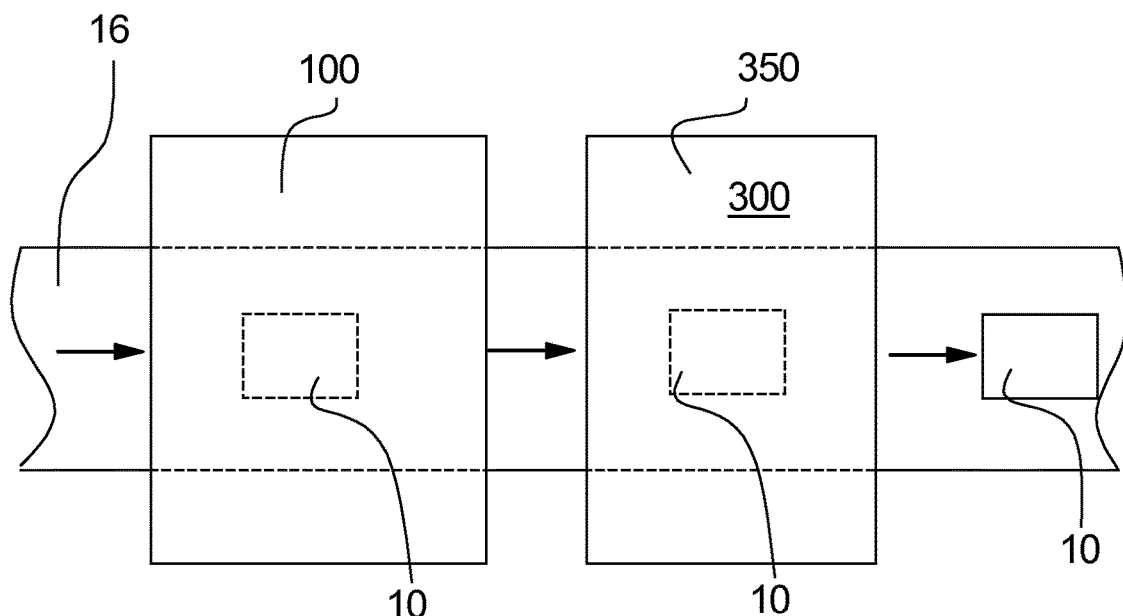
Figure 38:
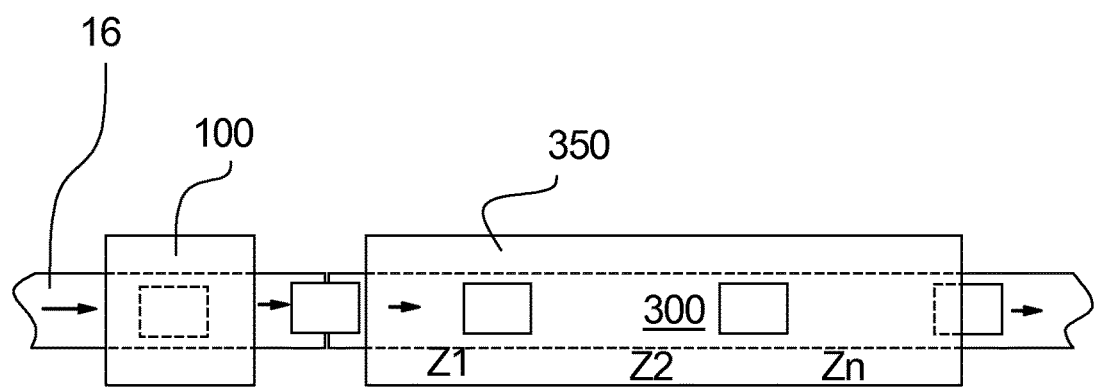
Figure 39:
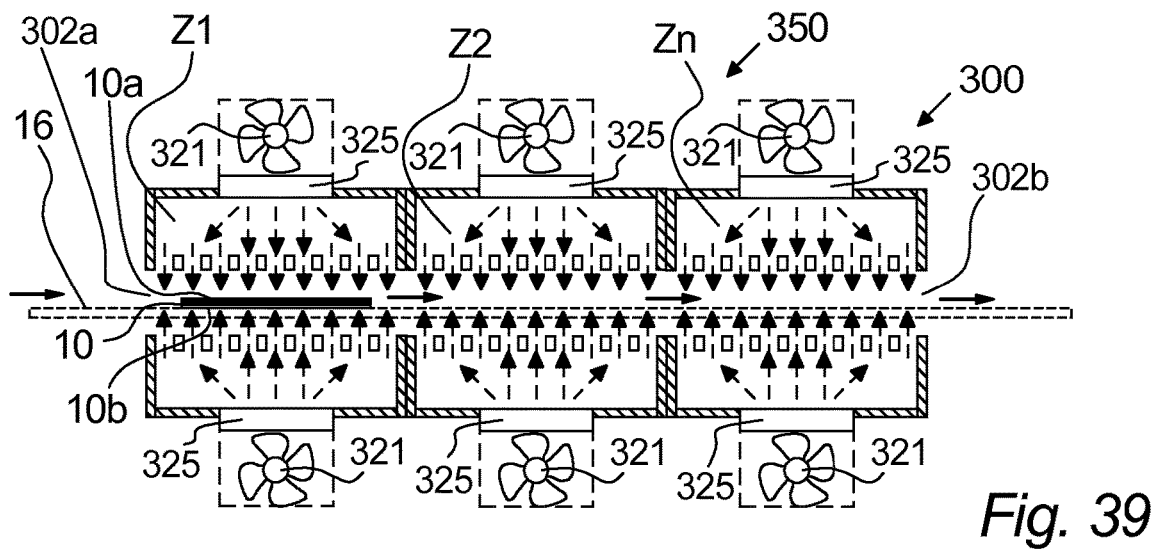
Figure 40:
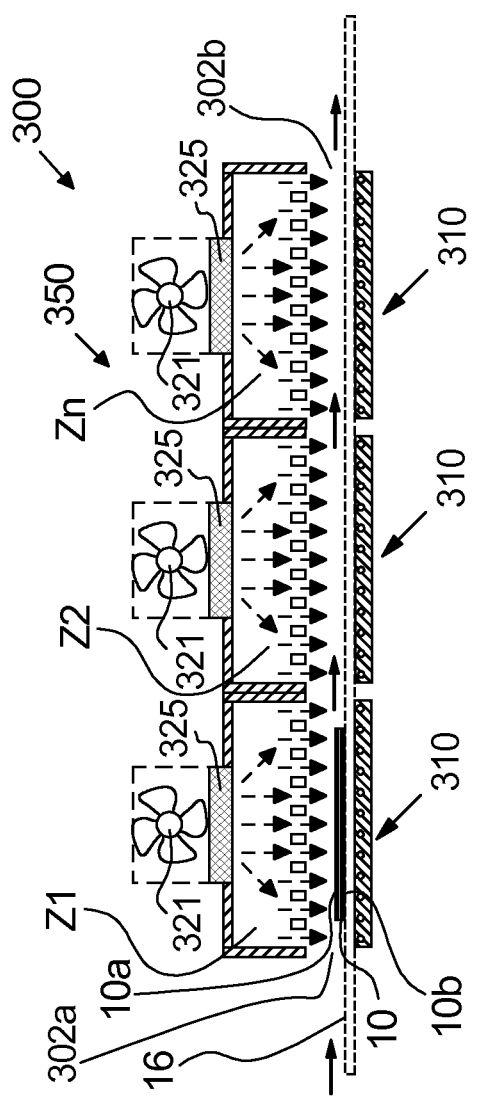

Aspects of the present disclosure will be described in the following with reference to the figures below in which:

FIG. 1: illustrates a lamination assembly according to embodiments of the present disclosure, FIG. 2: illustrates a method and system for providing a lamination of a lamination assembly according to embodiments of the present disclosure, FIG. 3 illustrates embodiments of the present disclosure wherein one or more heater elements are placed in or at clamping bodies, FIG. 4 illustrates embodiments of the present disclosure where a resilient layer is used, FIG. 5 illustrates a lamination assembly supported by a transport member according to embodiments of the present disclosure, FIG. 6 illustrates schematically embodiments of the present disclosure where a lamination assembly is arranged in a vacuum enclosure, FIGS. 7-12 illustrates embodiments of the present disclosure where a lamination assembly is subjected to different temperatures during lamination, FIGS. 13-13*a* illustrates embodiments of the present disclosure wherein an inflatable member is used, FIGS. 14-15 illustrates embodiments of the present disclosure relating to heating arrangements for heating a lamination assembly, FIGS. 16*a*-16*b* illustrates a lamination assembly before and after a lamination process according to embodiments of the present disclosure, FIGS. 17a-18a illustrates a laminated VIG unit according to various embodiments of the present disclosure, FIG. 19 illustrates embodiments of the present disclosure where a pressure chamber is used for providing a compression pressure, FIG. 20 illustrates a flowchart according to embodiments of the present disclosure, FIG. 21 illustrates a building comprising one or more laminated VIG units according to embodiments of the present disclosure, FIGS. 22-24 illustrates a lamination process according to various embodiments of the present disclosure, FIG. 25 illustrates embodiments of the present disclosure where an inflatable member for providing a compression pressure is arranged below a lamination assembly, FIG. 26 illustrates embodiments of the present disclosure where a further sheet and lamination layer of a lamination assembly are arranged on top of the VIG unit, FIG. 27 illustrates embodiments of the present disclosure where resilient layers are used at both sides of a VIG assembly during a lamination cycle, FIG. 27a illustrates a heating step according to further embodiments of the present disclosure, FIG. 27b illustrates an embodiment of the present disclosure where different compression pressure settings are applied dependent on VIG unit assembly type, FIG. 28 illustrates embodiments of the present disclosure, where a heated lamination assembly is subjected to a cooling step, FIG. 29 illustrates embodiments of the present disclosure where a cooling step is provided by means of convection cooling, FIG. 30 illustrates embodiments of the present disclosure where a cooling step is provided by means of convection cooling directed at one major surface, FIG. 31 illustrates further embodiments of the present disclosure where conduction and convection cooling is provided in a cooling step, FIGS. 32-33 illustrates graphs of a cooling step according to embodiments pf the present disclosure, provided by means of a cooling system FIGS. 34-36 illustrates graphs of cooling profiles according to various embodiments of the present disclosure, FIG. 37 illustrates a lamination solution comprising a heating step followed by a cooling step, according to embodiments of the present disclosure, FIG. 38 illustrates a lamination solution comprising a heating step followed by a zone-divided cooling step, and FIGS. 39-40 illustrates zone-divided cooling steps according to various embodiments of the present disclosure.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a cross sectional view of a lamination assembly 10 according to embodiments of the present disclosure.

The lamination assembly 10 comprises a vacuum insulated glass (VIG) unit 11. The VIG unit 11 comprises two thermally tempered glass sheets 11a, 11b separated by a plurality of support structures 12 distributed in a gap 13 between the tempered glass sheets 11a, 11b. An edge sealing 14 made from e.g. a soldering material such as a low temperature solder glass material which may be lead free, or alternatively a metal seal, extend between the glass sheets and enclose the gap 13 so it is sealed. The gap 13 is been evacuated to a pressure below $10^{-3}$ bar such as at or below $10^{-2}$, $10^{-3}$ or $10^{-4}$ mbar, and has been sealed. The evacuation of the gap 13 may e.g. have been established, prior to the lamination, through an evacuation opening (not illustrated in FIG. 1) in one of the glass sheets 11a, 11b which is subsequently sealed to maintain the reduced pressure in the gap 13.

The distance between the major surfaces of the VIG unit's glass sheets 11a, 11b facing the evacuated gap 13 may in embodiments of the present disclosure be less than 0.5 mm, such as less than 0.3 mm, for example around 0.2 mm or below 0.2 mm, for example around 0.1 mm The glass sheets 11a are made from tempered glass such as thermally tempered glass, and as illustrated, the major surface of the glass sheets are uneven/wavy which may be a result/side effect of the thermal tempering. The variation may be up to ±0.1 mm, providing a height difference between "crests" and "troughs", or also denoted as "peaks" and "valleys", of the surface tempered glass sheet surface of up to 0.2 mm or even more. It is however understood that the surface variations are exaggerated in order to enhance the understanding of the figures.

The lamination assembly 11 moreover comprises a lamination layer 2 arranged between an outer surface 20 of the tempered glass sheets 11b of the VIG unit 11 and a further sheet 3 of the lamination assembly 10. The further sheet 3 may have substantially the same width and length as the glass sheets of the VIG unit. The further sheet 3 may in one or more embodiments of the present disclosure be an annealed glass sheet, it may be a thermally tempered glass sheet, it may be a hard polymer plate transparent to light in the visible range and/or the like.

The lamination layer may in one or more embodiments of the present disclosure be a Polyvinyl butyral (PVB) or a Ethylene Vinyl Acetate (EVA) layer, or it may be a SentryGlass® plus lamination layer.

The lamination layer 2 may in one or more embodiments be a multi-layer lamination layer made from a plurality of sheets of lamination material such as e.g. PVB or EVA.

The outer major surface 10b of the further sheet 3 may provide a first outer major surface of the lamination assembly 10, and the outer major surface 10a of the glass sheet 11a of the VIG unit 11 facing away from the lamination layer may provide the other outer major surface (10a) of the lamination assembly 10.

It is to be understood that the outer surfaces 10a, 10b may be coated with a coating layer (not illustrated) in one or more embodiments of the present disclosure.

The lamination layer 2 may e.g. have a thickness th1 between 0.25 mm and 3 mm, such as between 0.4 mm and 2.7 mm, e.g. between 0.7 mm and 2.4 mm. The thickness th1 may in one or more embodiments of the present disclosure be obtained by means of a multilayer lamination sheet comprising a plurality of stacked sheets made from a lamination material such as e.g. PVB or EVA.

The multi-layer lamination layer may in one or more embodiments of the present disclosure e.g. comprise between 2 and 7 layers such as between 2-5 layers, e.g. between 3 and 5 layers of lamination material such as PVB or PVA. Each layer of these may have a thickness of about 0.2-0.5 mm such as between 0.3 and 0.4, e.g. about 0.38 mm, and may together provide a lamination layer 2 thickness of between 0.25 mm and 3 mm, such as between 0.4 mm and 3 mm, e.g. between 0.7 mm and 2.4 mm. For example in one or more embodiments, the lamination layer may comprise two sheets of 0.38 mm PVB or EVA, thus providing an about 0.76 mm lamination layer, or e.g. a layer 2 comprising three or four lamination sheets each having a thickness of 0.2-0.5 mm such as between 0.3 and 0.4, e.g. about 0.38 mm.

Alternatively or additionally, the lamination layer may be a multilayer lamination layer comprising layers providing different properties such as different optical properties, e.g. frosting effect, a colouring effect, a window tinting effect and/or the like, and/or it may provide further effects such as e.g. a heat reflecting effect.

FIG. 2 illustrates schematically a method and system for providing a lamination of a lamination assembly 10 according to embodiments of the present disclosure. The lamination assembly is arranged to be subjected to a compression pressure F during lamination of the VIG unit 11 by means of the system 100.

The lamination assembly 10 is arranged between clamping surfaces 4, 5 of clamping bodies 7, 8 of the system 100 for providing a heating step.

The lower clamping surface 4 provides a support and counter pressure/force for supporting a major surface 10*b* the lamination assembly when the clamping surfaces are moved relative to each other to provide the compression pressure F to the outer, major surfaces 10*a*, 10*b* of the lamination assembly 10.

Both clamping surfaces 4*a*, 4*b* is/are in the present example substantially plane and provided by rigid clamping bodies 7, 8 configured to be displaced by one or more mechanical clamping body displacers 6 to provide said compression pressure F. The clamping bodies 7, 8 may comprise metal plates or blocks, or it may comprise fibre reinforced blocks or plates or any other suitable type of material composition.

Generally, it is understood that the clamping bodies 7, 8 may be rigid bodies, but may e.g. comprise a substantially plane surfaces 4, 5, or alternatively a surface comprising protrusions and recesses such as slits and/or holes. The rigid bodies 7, 8 may in one or more embodiments of the present disclosure be partly hollow, e.g. to enclose a heating medium and/or the like.

Generally, in one or more embodiments, the clamping bodies 7, 8 may have the same size or may be larger than the cross sectional area of the major surfaces of the glass sheets of the lamination assembly 10, and the compression pressure F and/or heating may be provided substantially evenly to substantially the entire major, outer surfaces 10*a*, 10*b* of the lamination assembly 10.

The clamping body displacer(s) 6 may in one or more embodiments of the present disclosure comprise one or more mechanical clamping body displacer(s) such as linear actuators, for example one or more pneumatic or hydraulic linear actuators, one or more electrically operated linear actuators e.g. comprising a threaded spindle and nut actuator type where nut and/or spindle are rotated to provide a distance change between the surface(s) 4, 5, it may comprise a toothed wheel assembly e.g. comprising a rack solution connected to one or more toothed wheels and/or the like. It may also comprise non-linear actuators such as non-linear guides (not illustrated).

The clamping body displacer(s) 6 is/are controlled by a displacement control arrangement 6*a* communicatively coupled to the one or more clamping body displacer(s) 6, and comprising control circuitry which is configured to control the distance between surfaces 4,5 based on input from sensors (not illustrated) and/or human operators operating a user interface communicatively connected to the control circuitry (see also FIG. 27*b*). The sensors may e.g. comprise pressure sensors such as strain gauges or the like configured to provide input to controller 6*a* so that the controller can adapt the provided compression pressure F in accordance with the measured force.

In one or more embodiments of the present disclosure, the sensor may be sensors configured to measure the electrical current supplied to the clamping body displacers 6, if these are electrically controlled, as the current supplied may be indicative of the compression pressure F provided to the lamination assembly.

In one or more embodiments of the present disclosure, the compression pressure F applied to the lamination assembly 10 may be between 1.05 atm and 5 atm, such as between 1.2 atm and 2.5 atm, e.g. between 1.45 atm and 2 atm. This may be controlled by controller 6*a* based on e.g. input from the one or more sensors.

The lamination assembly 10 is thus placed between the surfaces 4, 5, and the compression pressure F is provided by moving one or both of the bodies 7,8 towards each other, thereby reducing the distance between surfaces 4, 5.

The compression pressure F may in one or more embodiments of the present disclosure be provided while one or more heaters (not illustrated in FIG. 2) heats the lamination assembly 10. This heating may comprise heating the further sheet 3 to soften the lamination layer 2 between the further sheet 3 and the VIG unit 11, and heating the VIG unit 11 to prevent a warping of the VIG unit 11 due to a temperature difference caused by the heating of the lamination layer as e.g. described in relation to various embodiments later on.

FIG. 3 illustrates schematically an embodiments of the present disclosure, wherein one or more heater elements 9*a*, 9*b*, such as electrical heating elements, or heated fluid heating elements, are placed in or at the clamping bodies 7,8. This provides a heating of the bodies 7,8, and this heating is transferred to the outer major surfaces 10*a*, 10*b* of the lamination assembly 10 by the surfaces 4, 5, thereby providing a heating of the lamination layer 2 and the VIG unit. The heating may in one or more embodiments of the present disclosure be provided after the compression pressure is provided.

It is understood that in further embodiments of the present disclosure, the element or elements 9*a* in or at the body 7 for heating the major surface 10*a* facing away from the lamination layer 2 may thereby be omitted. Alternatively, this heating may in further embodiments be provided by heating, such as convection heating, such as a forced convection heating by means of the ambient air/gas in the environment wherein the lamination assembly 10 is placed.

In an embodiment of the present disclosure (not illustrated), one or both clamping bodies 7, 8 may be provided by a sandwich construction. This may comprise two substantially solid blocks of a material such as aluminium, brass, copper or the like, and an electrical heating blanket 9*a*, 9*b* may be placed between these two blocks. The one of or each of these blocks may e.g. have a thickness of between 5 mm and 80 mm, such as between 10 mm and 40 m, e.g.

around 20 mm. For example it may be a 20 mm aluminium block+electrical heating blanket+20 mm aluminium block configuration.

The bodies 7, 8 may in embodiments of the present disclosure comprise different or the same heat capacities and/or different types of heating elements 9a, 9b. For example, the top body 7 may be of the above mentioned sandwich construction whereas the lower body may be a solid body with electrical heating cartridges embedded therein. The lower body may in embodiments have a higher heat capacity as it may be used for heating the laminated side of the VIG unit 11 comprising the further sheet 3 and the lamination layer, whereas the other side may be un-laminated and hence demand lesser capacity.

FIG. 4 illustrates schematically embodiments of the present disclosure wherein a resilient, and preferably also elastic, layer 15 such as a mat is placed between the lamination assembly 11 and the major outer surface 10a of the VIG unit, facing away from the lamination layer 2.

The resilient layer may be made from e.g. a silicone material a rubber material (e.g. synthetic or natural rubber) and/or a fabric material such as a cotton material e.g. made or chosen to be able to act as a resilient layer at the desired temperature(s) without being damaged. It may also in further embodiments of the present disclosure e.g. comprise a flexible layer comprising a Polytetrafluoroethylene (PTFE) composition, e.g. to provide a protective layer.

The thickness of the resilient layer may be between 1 mm and 10 mm, such as between 2 mm and 6 mm, e.g. between 3 mm and 5 mm, for example the thickness may be between 1 and 5 mm. In one or more embodiments, the resilient layer 15 may be a silicon mat that may have a thickness between 2 mm and 6 mm, such as between 2 mm and 4.5 mm.

The resilient layer or layers 15 may be attached to the surface 4 of the body 7 and/or 8, or may be a loose sheet that is/are placed to support/cover the surface of the lamination assembly before the compression pressure is applied.

The resilient layer 15 may in one or more embodiments of the present disclosure e.g. provide a heat insulating functionality to e.g. provide that the surfaces 10a, 10b are heated according to different heating profiles so that the surface 10b is heated faster and/or at a higher temperature than the surface 10a as e.g. described in more details later on.

The resilient layer 15 may e.g. be chosen in order to control the heat flux when heating the further sheet and/or the VIG glass sheet 11a, e.g. to obtain a different heat flux for these surfaces.

In further embodiments of the present disclosure, a resilient layer 15 may also be placed between the body 8 and the further sheet 3 (not illustrated in FIG. 4) e.g. distribute the compression pressure, to protect the lamination assembly surfaces, to provide a thermal insulation and/or the like, see e.g. FIG. 27. This layer 15 may have one or more of the same properties as suggested above, and/or may in further embodiments also be thinner than the sheet between VIG unit glass sheet 11a and the body 7 in order to e.g. obtain an increased heat flux to the further sheet 3 compared to the heat flux to the glass sheet 11a, if the bodies 11a, 11b comprises a heating solution.

FIG. 5 illustrates schematically a lamination assembly 10 supported by a transport member 16 according to embodiments of the present disclosure. The transport member/arrangement 16 is configured to support and transport the lamination assembly 10 to and from a location so as to be subjected to said compression pressure F and/or heating, see e.g. description above relating to FIGS. 2-3 and/or description below.

The transport member support on the clamping surface 5 and slides over this surface.

The compression pressure F is applied so that the transport member 16 is clamped between the lamination assembly 11 and surface 5.

The transport member 16 may comprise a sheet of soft material such as a woven fabric material. In one or more aspects of the present disclosure, the transport member 16 may be a polymer material such as a nylon/polyamid material, e.g. a nylon fabric sheet. The transport member 16 is arranged between a clamping surface 3 and the lamination assembly 10 while the compression pressure F is provided, and thereafter, the transport member 16 may move the lamination assembly 10 when the lamination process is sufficiently done/finished, e.g. to a cooling down location for further cooling the now laminated VIG unit. This is done after the compression pressure F has been released again by increasing the distance between surfaces 4,5.

The cooling may generally, in various embodiments of the present disclosure, be provided by a forced cooling solution, e.g. in a convection cooling chamber where a temperature controller controls the temperature and where cooling air/gas is supplied by means of one or more nozzles or the like (Various embodiments of this is described in more details later on in relation to one or more of FIGS. 28-40), or it may be provided by means of natural cooling.

The surface 5 may in one or more embodiments of the present disclosure be applied with a friction reducing layer (not illustrated) such as e.g.

Polytetrafluoroethylene (PTFE) based layer, to reduce friction when sliding the member 16 over the surface 5.

A transport member driver 17 such as an electric motor may control the movement of the transport member 16 and the lamination assembly 10 or lamination assemblies 10 transported on the transport member 16. The transport member 16 may in one or more aspects be arranged to provide/constitute a conveyer belt. Hence, when a sufficiently finished lamination assembly is moved away from the pressure arrangement 7,8, a new lamination assembly may be moved in between the bodies 7, 8 by the transport member 16. The belt 16 may e.g. be a PTFE conveyer belt with a poly-paraphenylen terephthalamid based mesh.

FIG. 6 illustrates schematically embodiments of the present disclosure where the lamination assembly 10 is arranged in a vacuum enclosure 18. The lamination assembly 10 is subjected to an evacuation step in the vacuum enclosure, e.g. during applying said compression pressure (F). This evacuation step may help to remove gas bobbles/remains between the lamination layer and the VIG unit 11 and/or between the lamination layer 2 and the further sheet 3.

The evacuation step may in one or more embodiments of the present disclosure help to apply a part of the compression pressure F, e.g. up to about 1 atm, and the remaining compression pressure may e.g. be provided by means of a mechanical clamping arrangement 7, 8, it may be provided in a pressure chamber (not illustrated) where the ambient air pressure outside the vacuum enclosure is raised and/or the like.

The evacuation step to evacuate the space between the vacuum enclosure 18 and the lamination assembly 2 is provided by a pump 18a arranged in fluid communication 18b (e.g. a tube/pipe or the like) with the interior of the vacuum enclosure 18.

The vacuum enclosure 18 is in the example of FIG. 6 a flexible sheet/bag that cover the lamination assembly 10 in an air-tight way and which can be evacuated to press onto the lamination assembly 10 and remove gas remains between the further sheet 3 and the VIG unit 11.

Figure 7:
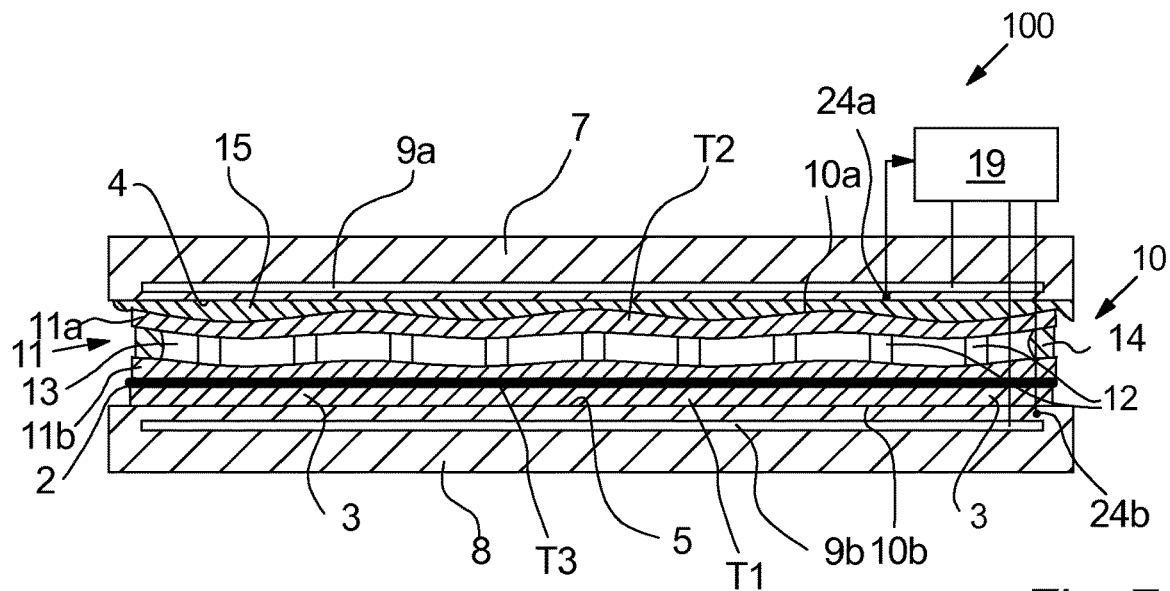

FIG. 7 illustrates schematically embodiments of the present disclosure where the outer major surfaces 10a, 10b of the lamination assembly are subjected to different heating temperatures T1, T2.

The outer major surface 10b of the further sheet 3 is subjected to a first heating temperature T1, and the outer, major surface 10a of the glass sheet 11a of the VIG unit 11 facing away from the further sheet 3 is subjected to a second heating temperature T2.

The first temperature T1 is higher than the second temperature T2 at substantially the same point in time in order to heat the lamination layer to soften the lamination layer to an extent where the lamination can be provided sufficiently, e.g. by means of applying a compression pressure as e.g. explained in various embodiments or aspects above and/or below.

Heating element or elements 9b provides temperature T1, and heating element or elements 9a provides temperature T2.

In one or more embodiments of the present disclosure, the temperature T1 provides that the lamination layer 2 is heated to a softening temperature T3 between 85° C. and 160° C., such as between 90° C. and 155° C., e.g. between 95° C. and 150° C. In further embodiments of the present disclosure, the lamination layer temperature may be heated to e.g. between 90° C. and 110° C., such as between 95° C. and 105° C.

In further embodiments, the lamination layer may be heated to a temperature between 100° C. and 190° C., such as between 125° C. and 165° C., e.g. between 140° C. and 150° C. during lamination.

The temperature T2 may e.g. be set or adapted to be substantially corresponding to the temperature to which the glass sheet 11b of the VIG unit facing the lamination layer 2 is heated due to the heating by T1.

The heating element or elements 9a, 9b are arranged in or at the heating bodies 7, 8.

A resilient layer 15 as e.g. previously explained may be arranged between the surface 10a and the heating element or elements. In the present example, the layer 15 is arranged between the outwardly facing surface 10a of the VIG unit and the heating element or elements 9a. In further embodiments of the present disclosure, (not illustrated in FIG. 3) a resilient layer 15 may be arranged between the further sheet 3 and the heating element or elements 9b.

In further embodiments, the resilient, preferably elastic, layer/mat 15 may be omitted.

In still further embodiments of the present disclosure, the heating element or elements 9a, 9b, such as electrical heating wires, may be embedded in the resilient layer 15 (not illustrated), or be arranged between the layer 15 and the body 7

A temperature controller 19 may on embodiments of the present disclosure comprise closed loop temperature control circuitry such as a PD (proportional-derivative controller) or PID (proportional-integral-derivative controller), or any other suitable type of closed loop control circuitry configured to control the heating of the surfaces 10a, 10b respectively to the different temperatures. The controller 11 may e.g. receive temperature information from temperature sensors 24a, 24b in, at or near the bodies 7, 8 which may be used for determining the temperature of the surfaces 4,5, and the controller 19 may control the heating arrangements 9a, 9b based thereon.

In other embodiments, the temperature controller may comprise an open loop control system.

The temperature difference between the first T1 and second T2 temperature may in one or more embodiments be provided by different temperature settings of the first and second heating arrangements 9a, 9b, e.g. controlled by the temperature controller 19.

In one or more embodiments of the present disclosure, the initial heating temperature T1 at the outwardly facing major surface 10b of the further sheet 3 may be higher than the initial temperature T2 subjected to the major surface 10a of the glass sheet of the vacuum insulated glass VIG unit 11 facing away from the further sheet 3.

The heating temperature T1 at the outwardly facing major surface 10b of the further sheet 3 may in one or more embodiments of the present disclosure be gradually increased. The heating temperature T2 may be subjected to the major surface 10a of the glass sheet of the vacuum insulated glass VIG unit 11 facing away from the further sheet 3 may be gradually increased at a slower rate than said first heating temperature T1. For example so that $$\frac{dT1}{dt} > \frac{dT2}{dt}$$

during the lamination process and determined at the same point in time, where T1 is said first temperature and T2 is said second temperature.

This may e.g., in one or more aspects of the present disclosure be provided during at least 10% of the heating time, such as at least 20% of the heating time, e.g. at least 35% of the heating time such as at least 50% of the heating time for heating the further sheet and/or the major surface of the glass sheet of the vacuum insulated glass unit facing away from the further sheet.

The first heating temperature T1 is in FIG. 7 provided by a first heating arrangement 9b, and the second heating temperature T2 is provided by a second heating arrangement 9a. These may e.g. comprise one or more electrical heaters, and/or be configured to provide heating by a fluid such as e.g. a heated oil which e.g. is supplied to the interior of heating bodies (7, 8) by a fluid flow of heated oil (not illustrated).

As can be seen in FIG. 7, the lamination assembly 2 may be arranged between first and second heating bodies 7, 8 comprising heating surfaces 4, 5 transferring heat to the VIG assembly at outwardly facing major surfaces 10a, 10b of the lamination assembly 10.

The second heating body 7 heats the outer, major surface 10a of the glass sheet of the VIG unit 11 facing away from the further sheet 3, and a heat insulating layer 15 such as a as a fabric layer, foam layer or the like as e.g. previously disclosed may be placed between the second heating body 7 and the lamination assembly 2 in further embodiments of the present disclosure.

The heating bodies 7, 8 may also, in one or more embodiments of the present disclosure, provide clamping bodies 7, 8 for providing a compression pressure F to the lamination assembly 10 during lamination of the vacuum insulated glass VIG unit 11 as e.g. disclosed above.

The heating surface 5 proximate the further sheet 3 and arranged to heat the further sheet 3 may transfer more heat to the outer surface 10b of the further sheet 3 per time unit than the heating surface 4 arranged to heat the outer, major surface of the glass sheet of the vacuum insulated glass VIG unit 11 facing away from the further sheet 3.

The heating by the first and second heating temperatures T1, T2 may in one or more aspects of the present disclosure be adapted in order to provide a substantially equal temperature of the glass sheets 11a, 11b of the VIG unit at the same time during the lamination process.

In one or more embodiments of the present disclosure, the first temperature T1 and the second temperature T2 are configured to follow different heating profiles.

Figure 8:
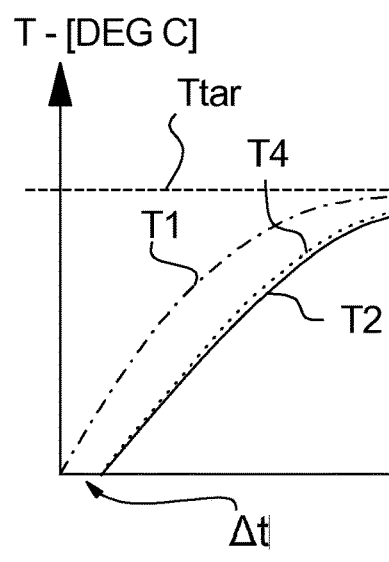

FIG. 8 illustrate an embodiment of the present disclosure where the first temperature T1 (dash/dotted line) and the second temperature T2 (solid line) are configured to follow different heating profiles. As can be seen, the surface of the further sheet 3 may be subjected to a faster temperature increase (see T1 profile as the dashed/dotted line), compared to the temperature increase of the glass sheet 11a of the VIG unit 11 comprising an outwardly facing surface 10a facing away from the lamination layer 2, towards a target temperature Ttar for the lamination layer.

The target temperature Ttar may in one or more embodiments of the present disclosure be at or near the temperature desired for softening the lamination layer sufficiently to provide the desired bonding and/or softness to allow a pressing of the VIG unit surface into the softened lamination layer 2.

The temperature T4 (dotted line) near the solid line T2 illustrates the temperature increase of the glass sheet 11b of the VIG unit proximate the lamination layer 2 due the T1 heating. As can be seen, this heating of glass sheet 11b may be delayed compared to the temperature T1 providing the heating of sheet 11b due to that the further sheet 3 and the lamination layer 2 are heated together with the glass sheet 11b.

T2 illustrates the temperature profile obtained by heating the glass sheet 11a of the VIG unit facing away from the lamination layer 2. As can be seen in FIG. 8, this heating may in one or more embodiments be time delayed Δt to accommodate/adapt to the delay in the heating of the sheet 11b due to that the further sheet 3 and the lamination layer 2 are arranged between the VIG and the heating surface 5. This may e.g. be controlled by e.g. increasing the temperature of the heater or heaters 9a later than the heater or heaters 9b to give the heating provided by the heater or heaters 9a time to be transferred through the further sheet and the lamination layer to the glass sheet 11b. The time delay ΔT may e.g. be more than 10 seconds, such as more than 50 seconds, e.g. more than 3 minutes, such as more than 5 minutes. For example, the time delay may be between 10 seconds and 10 minutes.

The time delay ΔT may be controlled by the temperature control arrangement 19 in one or more aspects of the present disclosure, e.g. by a closed loop control such as a PD or PID control, or an open loop control. Also or alternatively, the time delay ΔT be provided at least partly by placing a heat insulating layer 15, see e.g. FIG. 4, in between the heater arrangement heating the surface 10a, and/or by providing/selecting different materials and/or constructions of the bodies 7,8 having different heat transfer characteristics enabling that one body 8 transfer heat faster than the second body 7.

Figure 9:
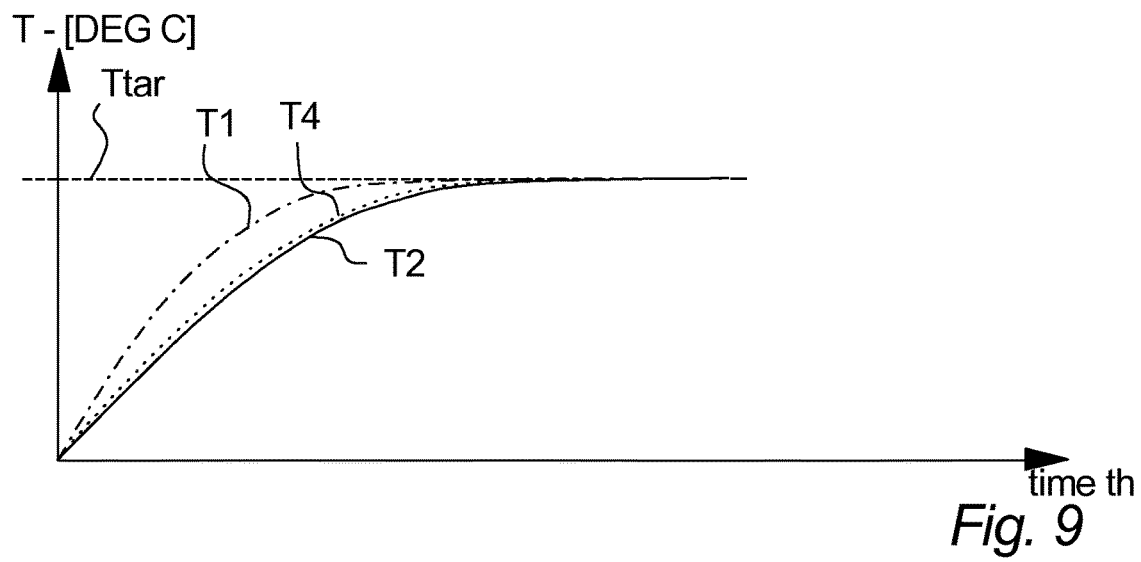

FIG. 9 illustrate a further an embodiment of the present disclosure where the first temperature T1 and the second temperature T2 are configured to follow different heating profiles. Here, the heating temperature T1 at the outwardly facing major surface 10b of the further sheet 3 is gradually increased. The heating temperature T2 subjected to the major surface 10a of the glass sheet of the unit 11 facing away from the further sheet 3 is gradually increased at a slower rate than the first heating temperature T1. The heating processes T1, T2 may here be started at substantially the same time, but due to the different heating slopes, the glass sheet temperature (T4—dotted line) of the glass sheet 11b will tend to follow the heat profile for the second temperature T2 due to that the further sheet 3 and the lamination layer need to be heated to heat the glass sheet 11b. The heating profile (solid line) for the second temperature T2 may in one or more embodiments of the present disclosure be adapted in order to follow the temperature change of glass sheet 11b, so that the glass sheets 11a, 11b does not vary too much towards the target temperature Ttar.

In FIGS. 8 and 9, the temperature of the glass sheet 11a may substantially follow the T2 heating profile.

Figure 10:
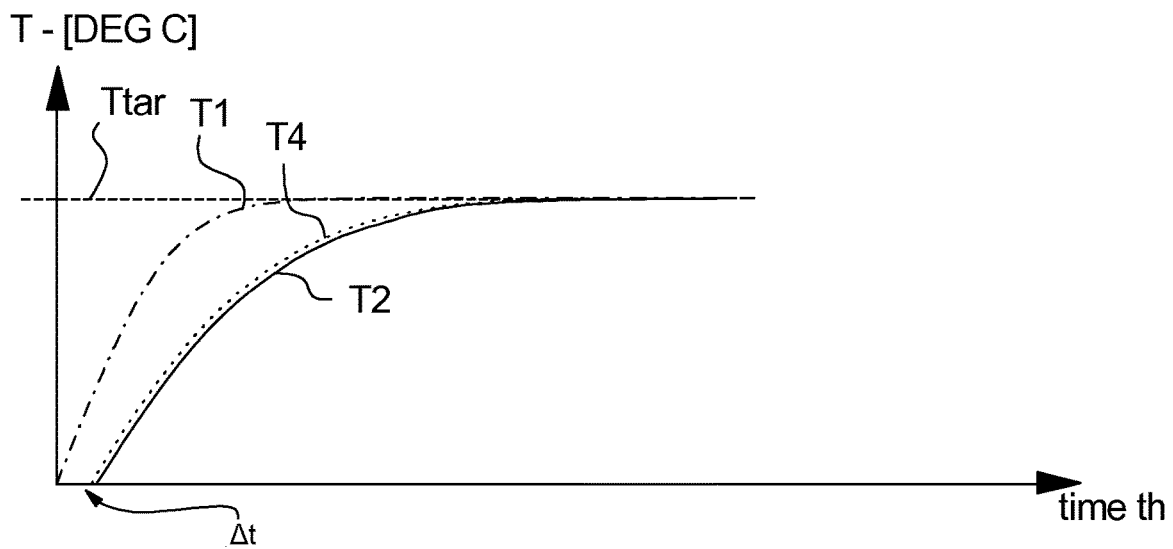

FIG. 10 illustrates an embodiment of the present disclosure where a combination of FIGS. 8 and 9 is disclosed where both a time delay is provided to the heating of the glass sheet 11a of the VIG unit and where the temperature T1 is raised on the further sheet 3 with a steeper slope than on the VIG unit glass sheet 11a having an outer surface facing away from the VIG gap 13 and the lamination layer 2.

Again, this may help to provide that the temperature T4 of the VIG glass sheet 11b facing the lamination layer is heated at a slope to which the heating temperature T2 is adapted.

FIG. 11 illustrates an embodiment of the present disclosure, where the temperature T1 end at a temperature above the desired target temperature Ttar for the lamination layer 2, e.g. as an overshot provide due to PD or PID regulation, so that the further sheet 3 may be subjected, at least in a short time span, to a temperature above the target temperature Ttar.

The temperature T2 of the sheet 11a however substantially follows the actual heating curve T4 of the glass sheet 11b provided due to the temperature T1.

FIG. 12 illustrates an embodiment of the present disclosure wherein the heating profile for temperature T1 provides a substantially constant temperature at the further sheet 3, e.g. as illustrated, at a temperature above the target temperature Ttar for the lamination layer 2. This provides the temperature raise as illustrated by T4 (dotted line) in the VIG glass sheet 11b proximate the lamination layer 2. The temperature T2 subjected to the VIG glass sheet 11a having a major surface facing away from the VIG gap 13 and the lamination layer 2 is regulated or in other ways adapted in order to substantially follow the T4 heating profile during the heating time th.

It is understood that the various embodiments described in relation to e.g. FIGS. 8-12 may provide a heating of the further sheet 3 and the VIG glass sheet 11a having a surface facing away from the VIG gap 13 and the lamination layer 2 which may be considered thermally asymmetric and/or thermal delayed due to the difference in T1 and T2, so that the temperature of the VIG unit glass sheets 11a, 11b may thereby be maintained at a desired temperature during the heating of the lamination layer and the resulting heating of the VIG glass sheet 11b proximate the lamination layer 2.

For example, the various embodiments described in relation to e.g. FIGS. 8-12 may help to provide an increased heat flux to the further sheet 3 and the lamination layer 2 compared to the heat flux provided to the VIG unit glass sheet 11a facing away from the further sheet 3, while avoiding a too large temperature difference between the glass sheets 11a, 11b during the lamination.

In one or more embodiments of the present disclosure, as e.g. illustrated in one or more of FIGS. 8-12, the heating T1 of the further sheet 3 and the heating T2 of the glass sheet 11*a* of the VIG unit facing away from the further sheet may follow different heating profiles.

In one or more embodiments of the present disclosure, as e.g. illustrated in one or more of FIGS. 8-12, the heating T1 of the further sheet 3 and the heating T4 of the glass sheet 11*b* facing the lamination layer follow different heating profiles, as a consequence of a heating of the further sheet 3 and the lamination layer 2.

FIG. 13 illustrates an embodiment of the present disclosure wherein an inflatable member 21 is inflated to provide the compression pressure F to the lamination assembly 10.

In FIG. 13, the clamping surface 4 pressing towards the lamination assembly 10 is provided directly by the inflatable member 21, but as illustrated in FIG. 13*a*, the inflatable member 21 may also be arranged to displace a further, e.g. heated, part comprising the surface 4.

The inflatable member 21 is inflated by a blower 22 such as a pump, controlled by a displacement controller 6*a* communicatively coupled to the blower 22, which inflates the member 21 based on control signals from the displacement controller 6*a*. The blower 22 may thus be considered a clamping body displacer which displaces the surface 4 pressing onto the lamination assembly.

The gas blown into the inflatable member may in one or more embodiments of the present disclosure be heated in order to provide a heating of the VIG unit glass sheet 10*a*. Also or alternatively, in one or more embodiments of the present disclosure (not illustrated) the inflatable member 21 may comprise a heating arrangement 9*a* embedded therein or at the member 21.

The blower 22 may in one or more embodiments of the present disclosure be configured to deflate the inflatable member after the lamination layer has been heated and the compression pressure F has been provided, to e.g. more rapidly move the member 21 away from the lamination assembly or to at least rapidly reduce the pressure to e.g. improve the manufacturing time. This may e.g. e provided by reversing a rotation direction of the blower. Alternatively, in one or more embodiments a suction unit (not illustrated) separate to blowing unit 22 may deflate the inflatable member 21.

The inflatable member in FIG. 13 may have a soft/flexible wall 21*a* that adapt to the surface 10*a* of the lamination assembly 10.

The inflatable member 21 is arranged between the lamination assembly 10 and a counter hold body 23, so that the counter hold body 23 provides a counter pressure ensuring that the inflatable member will provide the compression pressure to the lamination assembly when inflated rather than just expand away from the lamination assembly.

FIG. 13*a* illustrates schematically embodiments of the present disclosure wherein a rigid body 7 is provided between the inflatable member 21 and the lamination layer (see FIG. 13). The rigid body 7, such as a metal body as a plate or block, is displaced when the inflatable member 21 is inflated by the blower 22, and the rigid body comprises a clamping surface 4 acting directly or indirectly in the lamination assembly to provide the compression pressure F. In further embodiments, a resilient layer 15 (not illustrated in FIG. 13*a* or 13) may be arranged between surface or surfaces 4, 5)

The rigid body 7 may in one or more embodiments of the present disclosure comprise a heating arrangement 9*a* as e.g. described above or below.

Also, a resilient layer may be arranged between surface 4 and/or 5 and a lamination assembly as e.g. previously described.

FIG. 14 illustrates schematically one or more embodiments of the present disclosure wherein the first heating arrangement 9*a* comprises a plurality of heaters, such as electrical heaters, controlled by control 19. The same applies for the second heating arrangement 9*b*. The controller 19 may control the plurality of the heaters in the first heating arrangement 9*a* individually or in groups, or all heaters 9*a* may be controlled simultaneously to provide the desired heating of the lamination assembly, e.g. based on feedback from a plurality of temperature sensors 24*a* (not illustrated).

Additionally, the controller 19 may control the plurality of the heaters 9*b* of the second heating arrangement 9*b* individually or in groups, or all heaters 9*b* may be controlled simultaneously to provide the desired heating of the lamination assembly at e.g. the further sheet 3 of a lamination assembly, e.g. based on feedback from a plurality of temperature sensors 24*b* (not illustrated). In other embodiments of the present disclosure, the heating arrangements 9*a*, 9*b* may only comprise one heater each distributed in, at or near the bodies 7, 8.

FIG. 15 illustrates schematically embodiments of the present disclosure, wherein a fluid such as a liquid heating medium, e.g. an oil, molten salt or the like are used as heaters in a heating arrangement 9*a*, 9*b* for heating the lamination assembly by heating surfaces 4, 5 of a body 7, 8.

The fluid are distributed from containers 26*a*, 26*b* containing the fluid heating medium 25*a*, 25*b* respectively. In FIG. 15, individual pumps 27*a*, 27*b* provides a circulation pf the heating medium 25*a*, 25*b* through a piping system 28*a*, 28*b* in the bodies 7, 8 thereby heating the bodies and thus surfaces 4, 5.

The fluid flow of heating medium 25*a*, 25*b* provided by the pumps 27*a*, 27*b* may in one or more embodiments of the present disclosure be regulated by the temperature controller 19 to control the Temperature T1, T2 as previously explained.

The heating medium 25*a*, 25*b* in the containers 26*a*, 26*b* may be heated to different temperatures in one or more embodiments of the present disclosure to e.g. obtain a different heating temperature of surface 5 and 4 respectively as e.g. previously described.

In one or more embodiments of the present disclosure which is/are not illustrated, both piping system 28*a*, 28*b* may be supplied from the same container with heating medium having the same temperature.

It is understood that the containers ma28*a*, 28*b* may each comprise a heater for heating the heating medium. In alternative or further embodiments (not illustrated), one or more heating medium heaters may be arranged to heat a fluid flow of heating medium 25*a*, 25*b* at a location in the supply line 29*a*, 29*b* between the containers 28*a*, 28*b* and the bodies 7, 8.

For both FIGS. 14 and 15, it is understood that the bodies 7, 8 comprising the surfaces 4, 5 in further embodiments may be configured to be displaced relative to each other by one or more clamping body displacers 6 (see e.g. previous description and figs.) so as to change the distance between the surfaces 4, 5 to provide a compression pressure F to a lamination assembly 10 arranged between the bodies 7, 8. The surfaces 4, 5 may thus both comprise heating and clamping surfaces.

FIGS. 16*a*-16*b* illustrates a lamination assembly before and after a lamination process according to embodiments of the present disclosure. In FIG. 16*a*, the glass sheet 11*b* of the VIG unit 11 facing the lamination layer support on the lamination layer. However, in the present example, the glass sheets 11a and 11b are tempered glass sheets such as thermally tempered glass sheets, having an uneven surface. Accordingly, not all of the major surface of the glass sheet 11b support sufficiently on the lamination layer.

When the compression pressure F is applied (see FIG. 16b) as e.g. previously explained in various embodiments of the present disclosure, the further sheet 3, such as an annealed glass sheet, and the glass sheet 11b are pressed towards each other, and as the lamination layer 2 is heated and thus softened, the surface of glass sheet 11b is forced into the lamination layer so that the lamination layer take up/absorb possible surface variations in the major surface of the tempered glass sheet facing lamination layer.

Crests of the tempered glass sheet 11b may thus be pushed into the softened lamination layer 2 and force it towards nearby troughs/depressions in the lamination layer 2 (see dotted arrows). This may in one or more aspects of the present disclosure be provided while an evacuation is provided to the lamination assembly to remove gas between the lamination layer 2 and the further sheet 3 and/or the VIG glass sheet 11b, see e.g. FIG. 6 and the description thereto.

FIG. 17a illustrates schematically a cross sectional view of a laminated VIG unit 200 according to embodiments of the present disclosure. The lamination layer 2 is arranged proximate/near the major surface of the glass sheet 11b of the VIG unit, This glass sheet 11b comprises comprising a gap evacuation opening 30 that has been used for evacuating the gap 13, and the gap evacuation opening 30 has been sealed by an evacuation opening seal 31, e.g. comprising a low melting point solder glass material, but it may also be another kind of seal, e.g. a metal seal, that has been heated in an evacuation cup (not illustrated) used for evacuating the gap 13 by covering and evacuating the gap 13.

In FIG. 17a, the sealed gap evacuation opening 30 and the evacuation opening seal 31 is covered by the lamination layer 2, so that the evacuation opening seal 31 extend into the lamination layer 2. This may have been provided by means of e.g. applying the compression pressure as e.g. described above.

FIG. 17b illustrates schematically a cross sectional view of a laminated VIG unit 200 according to embodiments of the present disclosure. Here, no lamination layer is present to cover the evacuation opening seal 31. This may e.g. be provided by utilizing a lamination layer where a part has been removed at the location of the evacuation opening 30 to provide space for the seal 31.

FIG. 17c illustrates schematically a cross sectional view of a laminated VIG unit 200 according to embodiments of the present disclosure. Here, no lamination layer 2 is present to cover the evacuation opening seal 31. Moreover, the further sheet 3 comprises a cut-out/recess or hole (as illustrated) at the location of the gap evacuation opening 13. The seal 31 may in one or more embodiments of the present disclosure extend into the opening 32 in the cut-out/recess or hole in the further sheet 3. However, in other embodiments the hole/opening 32 may be present but the seal 31 may not extend into the cut-out/recess or hole 32.

FIG. 17d, illustrates schematically a cross sectional view of a laminated VIG unit 200 according to embodiments of the present disclosure, where the hole 30 has a stepped configuration, and the seal 31 is placed in the stepped part of the evacuation hole 30, so it does not extend over a plane defined by the surface of the glass sheet 11b facing the lamination layer. Here, the lamination layer 2 and further sheet 3 cover the seal 31. In further embodiments of the present disclosure, the lamination layer 2 and/or further sheet 3 may however not cover the evacuation hole 30, e.g. as illustrated in FIGS. 17b and/or 17c. In still further embodiments of the present disclosure, the seal 31 in the stepped hole may however extend over a plane defined by the surface of the glass sheet 11b facing the lamination layer, e.g. as illustrated in FIGS. 17a, 17b and/or 17c.

FIG. 18 illustrates schematically a cross sectional view of a laminated VIG unit 200 according to embodiments of the present disclosure. The glass sheets 11a, 11b of the VIG unit enclosing the gap 13 are in the present example thermally tempered glass sheets, and having a rather uneven major surface such as e.g. varying in the range of e.g. up to 0.1 mm or even more. This may have been caused by the manufacturing of the thermally tempered glass sheets, and may e.g. be referred to as "roller waves", but it is understood that other types of surface variations caused by the manufacturing process of the thermally tempered glass sheet and/or the VIG unit may also be present. The thickness th1 of the lamination layer 2 varies in accordance with the surface variation of the thermally tempered glass sheet 11b abutting the lamination layer 2, and may thus have a thickness th1 between the glass sheet 11b and further sheet 3 which is between 0.25 mm and 3 mm, such as between 0.4 mm and 2.7 mm, e.g. between 0.7 mm and 2.4 mm, but varying across the surface due to the surface variation of the glass sheet 11b.

The lamination layer thickness th1 may in one or more embodiments vary VAR1 with at least 0.1 mm such as at least 0.2 mm, e.g. at least 0.3 mm between the further sheet 3 and the VIG unit 11 across the major surface of the VIG unit, dependent on the surface variation of the thermally tempered glass sheet 11b. The further sheet 3 is a glass sheet such as an annealed glass sheet which may suffer from far less surface variations, but it may also in other embodiment be a thermally tempered glass sheet.

It is understood that dependent on the magnitude of the reduced pressure in the evacuated gap 13, the support structures 12 may also tend to provide small surface variations (not illustrated) at the surface of the tempered glass sheet 11b facing or abutting the lamination layer 2. These may also add on to the surface variation magnitude of the glass sheet's 11b outer major surface facing the lamination layer 2.

It is also understood that the magnitude of the surface variations of the glass sheet 11b may vary across the surface of the glass sheet 11b. For example, the surface variation of the glass sheet's 11b major surface may be larger or smaller at the 10-30% of the glass sheet's 11b surface area placed nearest the edge sealing (not illustrated in FIG. 18), when compared to the surface variation at a centre zone of the VIG unit, such as at the 10% of the major surface of the glass sheet 11b that surrounds the centre of the glass sheet's 11b surface facing the layer 2. This may e.g. be caused by the presence of the edge seal.

The variation VAR1 may be estimated or measured between selected neighbouring crests/peaks CR and/or thoughs/valleys VA of the surface of the glass sheet 11b as illustrated in FIG. 18. These rests CR and valleys VA may e.g. be so called "roller waves" provided during the manufacturing of the glass sheet 11b.

The thickness variation VAR1 may e.g. in one or more embodiments of the present disclosure be up to 0.6 mm between peak/crest to valley/though, e.g. the variation VAR1 may be between 0.1 mm and 0.5 mm or between 0.2 mm and 0.4 mm from peak to valley.

Alternatively the thickness variation VAR1 may be measured between two crests CR as illustrated in FIG. 18a, where these crests are separated by further intermediate crests in the surface of the thermally tempered glass sheet 11b facing the further sheet 3. In FIG. 18a, the thermally tempered glass sheet 11b extends along a bending curve GBP which may be drawn through the centre plane of the glass sheet 11b. The bending curve GBP (dash-dotted line) may be provided due to an uneven glass sheet 11b, where this unevenness is provided during the manufacturing of the sheet 11b and/or the VIG unit 11. It may though be advantageous to avoid such global bending curves GBP, and a thickness variation caused thereby, as it may provide undesired optical distortions in the VIG unit that may be visible to the human eye after the lamination process.

It is generally understood that the thickness variation VAR1 may be determined by measuring the thickness of the lamination layer between the glass sheet 11b and the further sheet (3) (such as perpendicularly to a major surface, such as surface 10b) of the further sheet 3, and subtract the measured larger distance from the shorter distance.

The thickness variation VAR1 may e.g. be measured by means of a suitable optical measurement solution. For example, a low-coherence fiber optic interferometer measurement solution may be used. For example, a time-domain low-coherence interferometry solution may be used for determining the thickness variation. It may e.g. be a Michelson interferometer based measurement solution used for determining the lamination layer thickness variation VAR1. The measurement of the variation VAR may be a non-destructive measurement that does not damage the laminated VIG unit to an extent so that the reduced pressure in the gap 13 is equalized.

The thickness variation may e.g. be measured while the thermally tempered glass sheets 11a, 11b of the vacuum insulated glass unit 11 enclosing the gap 13 have substantially the same temperature, such as within 5° C., and so that no external forces, except gravity and the atmospheric pressure, acts on the laminated VIG unit.

The lamination layer thickness may vary VAR1 with no more than 0.4 mm such as no more than 0.3 mm over at least 90% such as at least 95% such as at least 98% of the surface of the thermally tempered glass sheet 11b to which the lamination layer 2 bonds.

FIG. 19 illustrates schematically embodiments of the present disclosure where the lamination assembly 10 is arranged in a flexible vacuum enclosure 18 such as a flexible sheet/bag that cover the lamination assembly 10 in an air-tight way and which can be evacuated to press onto the lamination assembly 10 and remove gas remains between the further sheet 3 and the VIG unit 11. This evacuation is provided by a pump 18a arranged in fluid communication 18b (e.g. a tube/pipe or the like) with the interior of the vacuum enclosure 18.

The VIG assembly 2 is arranged in a pressure chamber 40 enclosed by walls 40a which can be pressurized by a pump 41 in fluid communication 42 with the pressure chamber 40. When pressurizing the pressure chamber 40 by the pump 41, this provides a compression pressure F to force the VIG unit and the further sheet towards each other. The remaining part of the compression pressure may be provided by means of the pump 18a and the vacuum enclosure 18, and/or the previously described bodies comprising clamping surfaces for providing a compression pressure (not illustrated in FIG. 19).

FIG. 20 illustrates a flow chart according to various embodiments of the present disclosure, e.g. as disclosed in relation to various embodiments described above.

In the first step S201, the lamination assembly 10 is provided, and arranged in a vacuum enclosure such as a bag or an evacuation chamber. Then the evacuation is provided in step S202, and the compression pressure is provided in step S203. Then the heating is provided in step 204 to heat the lamination layer 2 to soften it so that the compression pressure forces the glass sheets 11b, 3 towards each other. After this, the compression pressure is released in step S205, the lamination assembly 2 is removed again, and a new lamination assembly may be provided for the lamination process. It is understood that step S204 in further embodiments of the present disclosure may be started before a compression pressure above 1 atm. is applied.

FIG. 21 illustrates schematically a building 80 seen from the outside/exterior, comprising apertures 81 for windows 82 and a door 83 in the outer wall 84 of the building 80. The building also comprises a roof structure 85 comprising a roof window 82a.

The apertures 81 are covered by one or more laminated VIG units 200 manufactured in accordance with one or more of the embodiments of the present disclosure. The VIG units 200 are placed in a frame 71, and the frame 71 is then attached by fastening parts (not illustrated) such as mechanical fastening parts in the form of one or more hinges, screws, nails, mounting and/or the like to the wall 84 or a part of the roof structure 85 dependent on the aperture covering type (e.g. a roof window 82a.

Generally, it is to be understood that the glass sheets described in this document and used for VIG assemblies/units may in one or more embodiments be transparent to light such as light having a wavelength in the range of about 400 nm to 700 nm to at least such a degree which enables humans to see through the glass sheets of the VIG unit. Also the glass sheets may be configured so that infrared light (about 700 nm to 1 mm) is transmitted through the glass sheet, or reflected.

One or more of the glass sheets may e.g. comprise a low-E coating for improving the U-value of the VIG. The low E coating may be arranged at a major surface of one of the glass sheets 11a, 11b, and faces the gap 13 between the glass sheets.

In further embodiments of the present disclosure, the VIG units manufactured in accordance with one or more of the embodiments described in this document may be used for e.g. refrigerator units or ovens such as conventional household ovens as e.g. windows allowing viewing into the interior of such appliances.

FIG. 22 illustrates schematically a lamination process according to embodiments of the present disclosure,
  where the space between the further sheet 3 and the VIG glass sheet 11b facing the lamination layer 2 is evacuated (see dashed line 52) by a vacuum pump to remove gas between these 3, 11b,
  Where mechanical pressure (dash-dotted line 51) is applied to provide further pressure/compression on the glass sheet, and
  where a heating (dotted line 53) is provided to soften the lamination layer 2.

The heating provides a temperature increase (solid line 50) in the interface between the lamination layer 2 and the VIG glass sheet 11b proximate the lamination layer 2, thereby heating the VIG glass sheet 11b.

It is generally understood that the values indicated in FIG. 22 are only examples according to embodiments of the present disclosure, and that e.g. other temperatures and/or pressure values may be selected in further embodiments of the present disclosure.

For example, the temperature to which the lamination layer is heated may in one or more embodiments of the present disclosure be in one of the ranges mentioned in relation to FIG. 7, for example, in one or more embodiments, between 90° C. and 110° C., such as between 95° C. and 105° C.

In the illustrated example, the VIG assembly is placed before time t1.

At time t1, the heating of the lamination layer is started.

At t2, the evacuation pump is started and this evacuates the space between the further sheet 3 and the VIG unit glass sheet 11b facing the lamination layer 2 as illustrated by dashed line 52. As can be seen, the evacuation of the space between the further sheet 3 and the VIG glass sheet 11b is provided between time t2 and time t3.

The heating provided to heat the further sheet 3 and thereby the lamination layer 2 is in the illustrated example kept substantially constant (see dotted line 53), but in further embodiments it may be controlled to vary according to a predetermined heating profile between t1 and t5. The heating 53 may in the present example be provided by heated clamping surface 5, which may be provided according to various embodiments explained above or below in the present disclosure.

The temperature at the VIG unit glass sheet 11a facing away from the lamination layer may be kept at the same temperature as the heating 53, but it may in further embodiments e.g. be kept lower or in other ways controlled, e.g. as explained in above, for example in relation to one or more of FIGS. 7-12.

At time t3, the mechanically applied compression pressure is applied (dashed-dotted line), after the space between further sheet and VIG unit is sufficiently evacuated.

It is understood that in further embodiments, the mechanical compression pressure may be applied even before the indicated time t3 in FIG. 22, e.g. as illustrated in FIG. 24, where the pressure 51 is applied while the evacuation pump still reduces the pressure in the space between further sheet 3 and VIG unit 11 to evacuate gas. This may e.g. help to evacuate the space between the further sheet 3 and the VIG glass sheet 11b faster and/or more efficiently.

As can be seen in the example of FIG. 22, the heating of the lamination layer 2 gradually increases substantially from time t1 to the target temperature Ttar.

At t4, the applied compression pressure 51 is removed or reduced again, but the temperature 50 may continue to increase after the mechanical compression is removed or reduced at t4, e.g. as the further sheet 3 may continue to heat the lamination layer 2, e.g. as the lamination assembly still may support on the heating surface. At time t5, the vacuum is removed again, and the VIG assembly is removed at t6 to cool the lamination layer 2, e.g. by natural cooling or in a cooling compartment/chamber where the temperature is controlled to provide a cooling.

It is understood that t6, where the lamination assembly is removed, in further embodiments may be adjusted/moved dependent on e.g. the desired temperature for the lamination layer 2, the heating temperature 53 and/or the like.

In one or more embodiments of the present disclosure, the lamination process from start of the heating of the further sheet (t1) to the end where the lamination assembly is removed again (t6) may take between 5 and 30 minutes, such as between 10 and 15 minutes. This may however depend on or be adjusted dependent on the heating temperature 53 for the lamination layer 2, the desired target temperature Ttar for the lamination layer and/or the time (t3 to t4) the compression pressure is applied.

FIG. 23 illustrates schematically a lamination process according to embodiments of the present disclosure, where the lines 50-53 indicates the same parameters as in FIG. 22. The lamination assembly is placed at time t1. The heating of the lamination layer 2 by heating the further sheet 3 is however delayed in time (starting at time t2a) compared to the start of the evacuation (starting at time t2) of the space between the further sheet 3 and the VIG glass sheet 11b facing the lamination layer 2 by an evacuation pump and/or by the mechanical pressure as e.g. previously described.

The time delay between time t2 where the evacuation is started, and time t2a where the heating is started, may e.g. be adjusted/adapted so that the heating does not cause sealing of the lamination layer at the edges so that remaining gas in the space between the further sheet 3 and the VIG glass sheet 11b facing the lamination layer 2 cannot leave before the desired evacuation in the space between the further sheet 3 and the VIG unit has been obtained by the a vacuum pump and/or a further mechanical pressure as e.g. described in various embodiments above.

In further embodiments of the present disclosure, the heating may be provided from the start as e.g. illustrated in FIGS. 22 and 24, and may be timed with the evacuation speed, e.g. by selecting a properly sized evacuation pump and/or by controlling the heating speed, to avoid a that the sealing of the lamination layer 2 at the edges is caused too soon.

FIG. 25 illustrates schematically one or more embodiments of the present disclosure, substantially similar to the embodiments of FIG. 13a. However, the rigid body 7 and the inflatable member 21 for displacing the body 7 are here arranged below the lamination assembly 10 so that the lamination assembly support on the displaceable (and e.g. also heated) body 7. The body 7 and the lamination assembly 10 are thus displaced upwards when the member 21 is inflated, thereby providing the compression pressure F. When the compression pressure is released by e.g. stopping the blower 22 and e.g. opening a valve (not illustrated), and/or by reversing the blower 22, the rigid body 7 and the lamination assembly 10 automatically help to deflate the member 21 due to the weight of these and due to gravity.

FIG. 26 illustrates a further embodiment of the present disclosure where the further sheet 3 and lamination layer 2 are arranged on top of the VIG unit 11, facing VIG unit glass sheet 11b, and the compression pressure is applied by surfaces 4, 5 while the lamination assembly 10 is arranged in this way, e.g. in accordance with one or more of the embodiments described above. In further embodiments, as illustrated in a plurality of the figures previously described, the VIG unit 11 may in one or more embodiments of the present disclosure be arranged on top of the further sheet 2 and lamination layer 3 so that the VIG unit 11 provides a pressure on the lamination sheet 2 due to gravity. FIGS. 27 and 27a illustrates an embodiment of the present disclosure, where resilient layers 15a, 15b are used at both sides of a VIG assembly 10 during a lamination cycle where a compression pressure is applied between clamping bodies 6, 7 by clamping body displacers 6.

It is generally understood that the resilient layers 15a, 15b may have different thicknesses (see FIG. 27a). In embodiments of the present disclosure, the resilient layer 15a arranged at the major outer surface 10b where the further glass sheet 3 is placed may be thinner than the resilient layer 15b placed at the major outer surface 10a of the unlaminated side of the lamination assembly 10. In one or more embodiments, the thickness of the resilient layer 15b arranged at/proximate the surface 10b may be between 2 mm and 6 mm, such as between 2 mm and 4 mm e.g. obtained by a single or a plurality of layered mats. The thickness of the layer 15a arranged at/proximate the surface 10a may be between 4 mm and 10 mm, such as between 6 mm and 10 mm, e.g. about 8 mm obtained from for example layered mats such as a 3 mm and 5 mm resilient, elastic silicone mat. It is understood that any other suitable material for the mats 15 may be provided, and it may also be a combination of materials such as e.g. a fabric and silicone sheet combination.

FIG. 27a illustrates a further embodiment of the present disclosure (where the body 7 has been refracted from the lamination assembly), where a transportation arrangement 16 such as a conveyer belt or the like is placed between the lamination assembly 10 and the lower heating body 8 as previously explained. The resilient layer 15b is in FIG. 27a placed on this transportation arrangement 16 between the transportation arrangement 16 and the lamination assembly 10. In other embodiments, the resilient layer 15b may however be arranged between the transportation arrangement 16 and the lower body 8, and may be reused for several consecutive heating steps to heat a plurality of lamination assemblies without intermediate removal of the layer 15b, and the transportation arrangement may hence move relative to this resilient layer. A further low friction layer may in further embodiments of the present disclosure be provided between the resilient layer 15b and the transportation arrangement 16 so as to ease the sliding of the transportation arrangement 16 over the resilient layer 15b.

FIG. 27a illustrates a further embodiment of the present disclosure, wherein the upper resilient layer 15a is retained by a flexible retainer 16a such as a belt or the like, between the lamination assembly 10 and the resilient layer 15a. The retainer 16a can be displaced by the clamping body 7 when lowered towards the major surface 10a. This may e.g. provide easier adaption and/or replacement of the resilient layer 15a and may provide an advantageous way of reusing the layer 15a for several consecutive heating steps applied for different lamination assemblies. In other, further embodiments, the resilient layer 15a may be attached to the body 7, and the retaining top belt 16a may be omitted, or it may be a loose sheet of material (as may the layer 15a) arranged at the lamination assembly 10 before it enters in between the bodies 7, 8.

In still further embodiments of the present disclosure, as e.g. illustrated in FIG. 27a, a sheet 16b with an open air-permeable structure, such as a flexible mesh, fabric or perforated sheet, may be provided between the upper surface 10a and the body 7, such as between the upper surface 10a of the lamination assembly and the top belt 16a (as illustrated), or between the upper surface 10a of the lamination assembly and the resilient layer/member 15a. The sheet 16b with an open air-permeable structure 16b may e.g. be a synthetic fluoropolymer mesh of a tetrafluoroethylene such as a PTFE (Polytetrafluoroethylene) sheet, but other materials may also be used. This sheet 16b may help to avoid or reduce the risk of the lamination assembly 10 sticking to the top body 7, e.g. due to a suction cup effect, and is lifted by this from the bottom body 8 when the distance between the heating bodies 7,8 is increased again after the heating operation where the clamping of the lamination assembly between the bodies 7, 8 is provided.

FIG. 27b illustrates a still further embodiment illustrates an embodiment of the present disclosure where different compression pressure settings are applied dependent on VIG unit assembly type. A lamination system 100 for laminating VIG units by a heating and compression step by means by clamping bodies 7,8 as e.g. previously described, is used. The VIG unit is placed between the clamping bodies 7, 8. These bodies may be part of a clamping assembly also comprising one or more resilient layers (15, 15a, 15b), meshes 16b and/or the like as previously described. As may the system 100 comprise a transportation arrangement 16 and/or a further belt/sheet 16b as described above. These are however not illustrated in FIG. 27b.

In FIG. 27b, the mechanical clamping body displacer(s) 6, such as linear actuators or the like is/are controlled by a displacement control arrangement 6a communicatively coupled to the one or more clamping body displacer(s) 6. This control arrangement 6a comprises control circuitry which is configured to control the distance between surfaces 4,5 of the bodies 7, 8.

In order not to either damage the lamination assembly (e.g. by providing cracks on the VIG unit's glass sheets or the lamination glass 3 or by compressing the support structures arranged in the evacuated gap of the VIG unit), and in order to at the same time provide a sufficient lamination, the system 100 is configured to adapt the compression pressure applied to the lamination assembly by means of the bodies 7,8 and the one or more clamping body displacers 6 based on a plurality of Pressure presets PRS_1-PRS_n stored in a data storage. As the system 100 may in embodiments of the present disclosure be configured to be used for laminating different sizes of VIG units, the pressure applied by the clamping body displacers 6 may be adapted to the size of VIG unit to be used. This may e.g. at least be based on the Length×Width measure of the VIG unit 11. Other factors such as the type of VIG unit (for example if it is a two layer VIG with one evacuated gap, a three layer VIG comprising two evacuated gaps, a hybrid VIG comprising an evacuated gap between a first and second glass sheet and a gas filled gap between a further glass sheet and one of the first and second glass sheets) may also result in different preset compression pressure values PRS_1-PRS_n.

The preset compression pressure values PRS_1-PRS_n are stored in a data storage DS. A user may hence, by means of a user interface UI, enter or select lamination assembly information such as VIG unit type information TY1n-TYn, such as a length×width size, select a predefined VIG unit type selectable by the interface UI and/or the like.

Based on the entered information, the control arrangement 100 selects a suitable pressure setting PRS1-PRSn stored in the data storage, and assures that this setting is applied by transmitting control signals to the clamping body displacer(s) 6 by means of control signal output OU, preferably while monitoring the clamping pressure applied by received input PRES_STAT.

The pressure settings PRS1-PRSn to be applied may in embodiments of the present disclosure be selected or calculated so that a compression pressure between 1.5 and 3.5 Newton/cm$^2$, for example between 2 and 3 Newton/cm$^2$, such as between 2.4 and 2.8 Newton/cm$^2$ is applied, and this may be controlled by selecting or calculating a pressure setting PRS1-PRSn corresponding to the VIG unit type such as a VIG size defined by a surface 10a, 10b area.

In further embodiments of the present disclosure a sensor arrangement for determining lamination assembly information may be used (not illustrated). This may e.g. comprise a barcode reader (e.g for matrix barcodes or conventional barcodes), an RFID reader or the like for automatically reading Identification Information (not illustrated) of the lamination assembly 10, e.g. by reading a VIG unit identifier on the VIG unit or on the lamination glass sheet 3, or placed between the lamination glass sheet 3 and the VIG unit 11. The sensor arrangement may e.g. in embodiments of the present disclosure be placed to read identification information on lamination assemblies arranged at a transport member (not illustrated in FIG. 27b, see e.g. FIG. 5) prior to entering in between the clamping bodies. Based on this information, the control arrangement 6a may retrieve relevant information from a data storage, e.g. the data storage DS relating to e type TY1n-TYn of VIG unit. Also, /or alternatively, the sensor arrangement may be used for measuring the surface area if the VIG unit assembly, e.g. the area of the surface 10a as illustrated in other figures described above. Based on this retrieved information, the arrangement 6a such as the controller CT may calculate or select a compression pressure setting to be applied during the heating step for the respective lamination assembly type TY1n-TYn.

In still further embodiments of the present disclosure, the control arrangement 6a may, instead of selecting presets PRS1-PRSn, be configured to calculate a pressure setting. This may be provided each time a user provides one or more new selections by means of the User Interface UI, and/or when/if a sensor arrangement provides new lamination assembly information as mentioned above. The controller CT may hence provide a clamping pressure calculation having e.g. at least a predefined constant and a variable such as the VIG unit size information (such as length and width) as calculation parameters.

FIG. 28 illustrates schematically an embodiment of the present disclosure, where the heated lamination assembly 10 is subjected to a forced cooling step. The cooling step cools the lamination layer 2 to harden the lamination layer 2 after a heating step provided according to e.g. one or more embodiments described above, for example by means of a "heat and clamp" solution where clamping bodies 4, 5 are used to provide a compression pressure F during heating and softening of the lamination layer 2 as disclosed in relation to one or more of the figures described above.

The heated lamination assembly 10 enters a cooling chamber 300 enclosed by walls 301 through an inlet 302a by means of a transport system 16 such as a conveyer. The conveyer 16 may in embodiments of the present disclosure be the same, or be arranged in continuation of a transport solution 16 used during the heating step. See e.g. FIG. 5. While the heated lamination assembly 10 is placed in the chamber/compartment 300, it is subjected to a forced cooling provided by means of a cooling system 350. The cooling system 350 in FIG. 28 is configured to provide a convection cooling by means of a convection cooling arrangement 320, and a conduction cooling by means of a conduction cooling arrangement 310 respectively.

The lamination glass sheet 3 of the lamination assembly 10 supports on a surface 311 of the conduction cooling arrangement 310 to provide a heat transfer from the lamination glass sheet 3 to the conduction cooling arrangement 310, in the present example through the transport system 16 (but this 16 may be omitted in further embodiments). Hence, heat is transferred from the lamination layer 2, through the lamination glass sheet 3, and thus from the outer surface 10b of the lamination assembly 10 to the conduction cooling arrangement 310, thereby cooling the lamination layer 2 to harden the lamination layer 2.

The conduction cooling arrangement 310 provides a forced flow of a cooling fluid 310 such as a gas or a liquid, such as water, oil or another suitable cooling liquid inside guiding tunnels or pipes 313 for guiding the cooling fluid 312 arranged or embedded in a cooling body 314 such as a metal body, e.g. an aluminium, brass or copper body 314. The cooling fluid 312 is circulated in the guiding tunnels/pipes 313 by means of a pump or a blowing unit (not illustrated in FIG. 28), hence transferring the heat from the lamination assembly 10 away from the lamination assembly 10 and cooling body 314, e.g. to a cooling device configured to reduce the temperature of the returned cooling fluid 312 before it re-enters the tunnels/pipes 313.

The convection cooling arrangement 320 comprises a ventilation system 321 for moving the ambient gas such as air over the other outer surface 10a of the lamination assembly, to cool this surface 10a. This gas may in embodiments of the present disclosure be heated to a desired, higher temperature by use of a heating arrangement and/or or reduced in temperature by a cooling arrangement.

In embodiments of the present disclosure, the cooling step may be provided until the lamination layer 2 reaches a temperature where it is hardened again after the heating step. This temperature may vary dependent on the selected material for the lamination layer. In embodiments, the cooling step may be considered finished when the lamination layer 3 has a temperature below 95° C., such as around 90° C., or such as around 85° C.

Naturally, further forced cooling may be provided in the chamber 300 or at another location in order to e.g. fast get the lamination assembly's temperature to a point where it may be more easy, cost efficient and/or safe to handle by human hands or by automation system components. Such components may e.g. comprise robotic equipment utilizing e.g. suction cups or the like for handling and rearranging the cooled lamination assembly that now constitutes a laminated VIG unit.

The VIG unit 11 may thermally deflect if it is subjected to a temperature difference between the glass sheets 11a, 11b due to a rigid edge seal between the glass sheets. According to embodiments of the present disclosure, it may hence be relevant to provide the cooling of the sheet 3 and the glass sheet 11a in order to obtain a desired deflection condition of the VIG unit at the point where the lamination layer 2 hardens, to provide a more controlled stress condition in the final laminated VIG unit. This may e.g. be controlled by providing a controlled cooling temperature at the conduction cooling system 210, and by the convection cooling system 320, to control the thermal deflection of the VIG unit around/in a desired temperature range that may be selected based on the viscosity profile (e.g. given by a Tg (T glazing) of the lamination material 2.

It is generally understood that the difference in temperature between the VIG unit's glass sheets 11a, 11b may preferably be kept below 65° C., such as below 45° C., for example below 20° C., for example below 10° C. by means of said cooling system 350 during at least 50% such as at least 70%, e.g. at least 90% of the time of said cooling step. This may e.g. be provided so that the difference in temperature between said at least two glass sheets (11a, 11b) of the vacuum insulated glass unit) is kept below 45° C., such as below 20° C., for example below 10° C. by means of the cooling system 350, at least during the last 50%, such as during the last 25%, such as during the last 10% or last 5% of said cooling step by means of said cooling system before the lamination layer hardens.

The cooling system 350 may be configured so that the conduction cooling system 310 in embodiments of the present disclosure forces a larger heat transfer per time unit from the outer major surface 10b (the lamination side) of the lamination assembly 10, when compared to the heat transfer per time unit provided from the oppositely directed outer major surface 10a (unlaminated side) of the lamination assembly 10 subjected to the convection cooling by the convection cooling system 320.

In one or more aspects of the present disclosure, the total time from the heating step to soften the lamination layer 2 to bond it to the VIG unit 11 and the further sheet 3 as e.g. described previously, is initiated, and to the cooling step by means of the cooling system 350 is terminated and the lamination layer 2 is thus hardened again, may be less than 60 minutes, such as less than 40 minutes, for example less than 25 minutes.

It is generally understood that the cooling may be provided as a batch process in the chamber 300 or a substantially continuous process where multiple lamination assemblies are moved through the chamber 300, e.g. in a row on the transport system 16.

The now cooled lamination assembly 10 then leaves the cooling chamber 300 through an outlet 302a by means of the transport system 16.

FIG. 29 illustrates schematically a cooling step by means of a cooling system 350 according to further embodiments of the present disclosure, where convection cooling is provided at both outwardly facing major surfaces 10a 10b of the lamination assembly 10. A temperature controlled cooling gas 323a is supplied a plurality of gas nozzles/outlets 322, so as to cool the upwardly facing major surface 10a of the lamination assembly 11. In further embodiments, the plurality of nozzles may be omitted and a more indirect flow of gas 323a may be provided, e.g. by circulating the gas in the chamber 300. In the present case, the exposed surface 10a of the lamination assembly 10 facing upwards is the major outer surface 11a of the un-laminated side of the lamination assembly, and may thus be the outermost surface of the glass sheet 11a of the VIG unit.

The gas 323a is supplied through gas nozzles 322 distributed along the length of the cooling chamber 300, so as to blow and distribute cooling gas 323a to the surface 10a to cool the surface.

The lamination glass sheet 3 supports on a gas-permeable, perforated conveyer belt 16, and cooling gas 323b is supplied to the outer major surface 10b of the lamination glass sheet through a plurality of nozzles 324. The temperature and/or the amount of gas 323a, 323b supplied per time unit through the nozzles 322 and 324 respectively may be different in embodiments of the present disclosure. This may e.g. be set/adjusted so as to provide a faster cooling/heat transfer per time unit of the surface 10b compared to the cooling per time unit surface 10a during at least a part of the cooling step in the chamber 300. This may e.g. be achieved by providing a larger flow of gas 323b to the surface 10b of the lamination glass to cool the lamination layer 2, compared to the flow of gas 323b provided to surface 10a.

FIG. 30 illustrates schematically an embodiment of the present disclosure, where the cooling step is provided by mainly providing a convection cooling by the cooling system 350 to the lamination glass sheet 3 by means of a flow of cooling gas 323b directed towards this surface 10b. Some of the cooling gas reaches the surface 10b through a gas permeable conveyer arrangement 16. This gas cools the glass sheet's surface 3, and thereby the lamination layer 2. Some of this cooling gas is subsequently distributed to the other major surface 10a, hence also cooling this surface of the lamination assembly 10.

It is generally to be understood that a ventilator/blowing arrangement 321 may generate the flow of cooling gas 323b, and that a suitable heater or cooler 325 may control the temperature of the supplied gas 323b.

FIG. 31 illustrates schematically an embodiment of the present disclosure, where the cooling step is provided by means of conduction cooling as e.g. disclosed in relation to FIG. 28 to lower the temperature of the lamination glass sheet 3 and hence the lamination layer 2.

The conduction cooling is provided by means of a fluid such as a liquid circulated in a tube/tunnel arrangement 313 by means of a pump 341 or a blowing unit (not illustrated in FIG. 28). This cools the cooling body 314 and hence reduces the temperature of the lamination glass 3.

The pump/flow generator 341 supplies the cooling fluid into the tunnel arrangement 313 of the body 314. When the fluid leaves the cooling body, it is returned in a guiding pipe 315 to a cooling arrangement 342 which reduces the temperature of the cooling fluid before the fluid is reintroduced into the cooling body. The pump may be controlled by the cooling controller 340, and may operate substantially continuously during the cooling process. The cooling arrangement 342 may be controlled by the cooling controller during the cooling step in order to control and regulate the temperature of the cooling fluid provided to the cooling body 314. This regulation may be provided to obtain a substantially continuous fixed temperature of the cooling fluid within a relatively narrow temperature variation range, such as within ±10° C., for example within ±5° C. relative to a target temperature. Alternatively, the temperature of the recirculating cooling fluid may be adjusted over time in order to control the speed of the cooling at different time points during the cooling step. This regulation may in further embodiments of the present disclosure be provided by the cooling controller 340 based on feedback from one or more temperature sensors (not illustrated) such as thermocouples or the like measuring the temperature of the fluid and/or the cooling body at or near the surface providing the cooling of the lamination assembly.

As can be seen, an active, controlled cooling of the surface 10a facing away from the lamination layer of the cooling body the cooling controller 340 may be provided by means of convection cooling as previously described. Here, the cooling controller 340 may control a ventilation/blowing arrangement 321 in order to increase or reduce the amount of cooling gas such as air provided per time unit. Additionally, the cooling controller 340 may provide a temperature control of the cooling gas by means of a gas temperature regulation unit such as a gas heater or cooler 325 which controls the temperature of the supplied cooling gas 325b. This temperature may be based on sensor feedback (not illustrated).

It is generally understood that the cooling of the first 10a and/or second surface 10b of the lamination assembly may be controlled by the same or different cooling controllers 340. The control may comprise a closed loop control circuitry such as a PD (proportional-derivative controller) or PID (proportional-integral-derivative controller), or any other suitable type of closed loop control circuitry configured to control the heating of the surfaces 10a, 10b respectively to the different temperatures. Alternatively, the control may be less advanced and e.g. rely on an on/off control including temperature hysteresis control, based on pre-set, fixed temperatures of the cooling gas or liquid and/or amount of gas or liquid supplied, so as to cool the outer major surfaces 10a, 10b.

FIG. 32 illustrates schematically a graph according to embodiments of a cooling step provided by means of the cooling system 350, according to embodiments of the present disclosure. The dash/dotted line L1 represents the temperature of the laminated glass sheet 11b of the VIG unit. It is in the figure, for simplicity, assumed/estimated that the temperature (T) of the laminated glass 11b of the VIG unit 11 is substantially the same as the lamination layer 2 temperature. The solid line L2 represents the temperature of the un-laminated glass sheet 11b of the VIG unit. The Y-axis denoted (T) represents a temperature in e.g. ° C., and the x-axis denoted tc represents the time elapsed time during the cooling step.

At the time t0, the cooling step is initiated by the cooling system. The laminated side of the VIG unit where the lamination layer 2 and the lamination sheet 3 is placed has a higher thermal capacity/heat capacity than the other, un-laminated side of the VIG unit. Accordingly, reducing the temperature of the laminated side of the VIG unit to cool the lamination layer requires more heat transferred from this side, compared to the cooling of the other un-laminated side, to reach the same target temperature Tta.

As can be seen, the temperature of the un-laminated glass sheet 11a (L2) may relatively fast be reduced to be within a desired temperature hysteresis (defined between the dashed, horizontal hysteresis lines H1, H2) set based on a target temperature Tta (dotted horizontal line) of the lamination layer 2. See time tc1 where the temperature of the unlaminated glass sheet L2 reaches within the hysteresis at t1. For example, in embodiments of the present disclosure, a convection cooling arrangement may be set to a temperature around this target temperature Tta, so that the cooling gas is kept at that temperature, and keep it there, at least until the lamination layer 2 reaches within the same temperature range given by the hysteresis H1, H2.

It is generally understood that the target temperature Tta may be selected based on the viscosity characteristics of the lamination material and/or the desired end temperature of the lamination assembly. The target temperature Tta may e.g. be set based on a temperature around which the lamination layer 2 may be determined to be sufficiently hardened so that subsequent thermal deflection of the laminated VIG does not affect the lamination, at least within a selected temperature range.

Since a larger amount of heat needs to be transferred away from the laminated side of the VIG unit due to the higher heat capacity, to reach the same temperature within the target temperature Tta based hysteresis H1, H2, it may take a longer time to reach this temperature hysteresis, see L1. Eventually, it will reach a temperature within the hysteresis H1, H2, (see tc2) and here, the lamination layer may be sufficiently hard.

In further embodiments of the present disclosure, the time from tc0 and until tc2 for the lamination layer 2 to reach within the hysteresis H1, H2 may be reduced by forcing a larger heat transfer per time unit from the laminated side 10b, when compared to the heat transfer per time unit provided from the oppositely directed un-laminated side 10a, see FIG. 33. Alternatively the same heat transfer per time unit may be provided to both sides 10a, 10b, as illustrated in FIG. 32, though providing a longer time delay between tc1 and tc2 and hence a longer process time.

Since the temperature of the un-laminated glass sheet 11a of the VIG unit (in FIG. 32) is kept at or near the desired target temperature Tta within H1-H2, the VIG unit's thermal deflection may be very small when the glass sheet 11b reaches the same temperature range. Hence, a stress in the lamination layer of the final VIG unit due to thermal deflection may be low or substantially zero when the VIG unit glass sheets have substantially the same temperature, this may depend on the characteristics of the lamination layer material.

Generally, in aspects of the present disclosure, the cooling may be adapted or controlled to ensure that the temperature difference $\Delta t\_vig$ between the VIG unit glass sheets 11a, 11b is not too large during the cooling, to reduce the risk of damaging or weaken the VIG unit. Hence, in embodiments of the present disclosure, during the controlled cooling so as to harden the lamination layer 2, the difference in temperature between said glass sheets 11a, 11b of the vacuum insulated glass unit 11 enclosing the evacuated gap may be kept below 65° C., such as below 45° C., for example below 20° C., for example below 10° C. (measured at the substantially same point in time) by means of said cooling system. This may in embodiments of the present disclosure apply for at least 50% such as at least 70%, e.g. at least 90% of the time, such as at least 99% of the time of said cooling step, which is ended at the time tc3. In FIG. 32, the temperature difference $\Delta t\_vig$ between the VIG glass sheets 11a, 11b is illustrated at the point in time time tc1.

At tc3 the cooling step to make the lamination layer 2 harder is considered ended, in the present example at/near the lower temperature threshold H2.

A further, subsequent cooling after the time point tc3 may however in further embodiments of the present disclosure be provided to reduce the temperature of the lamination assembly with the now hardened lamination layer 2, see FIG. 32. This may for example be regulated by the cooling controller 340 as previously described or by moving the lamination assembly to a further location.

FIG. 33 illustrates schematically an embodiment of the present disclosure, where a more intense cooling is provided at the further sheet 3 compared to the cooling provided at the un-laminated side 10a of the VIG unit not comprising a lamination layer and further glass sheet. Hence, a larger heat transfer per time unit from the further sheet is obtained when compared to the heat transfer per time unit provided from the oppositely directed outer major surface 10a of the lamination assembly 10. This is despite the larger heat capacity on the laminated side given by the presence of the lamination layer that needs to be cooled to hardened, and also the further glass sheet 3.

Hence the time difference $\Delta tc=tc2-tc1$ between the point in time t1 where the VIG unit glass sheet 11a at the un-laminated side (L2), and the point in time t2 where the where VIG unit glass sheet at the laminated side (L1), reaches the temperature range where the lamination layer 2 hardens, in the present example within the hysteresis H1, H2, may be reduced. This may hence reduce the lamination process time while also providing a controlled cooling that may not e.g. risk damaging the VIG unit. Also or alternatively, it may help to provide a fast cooling while reducing the risk of unwanted stress conditions in the final laminated VIG unit when subsequently subjected to certain climatic conditions.

The cooling step (starting at time t0) and until the lamination layer 2 hardens sufficiently (at e.g. time tc3), and/or until the lamination assembly reached desired target "handling temperature", such as below 60° C. or below 45° C., may e.g. be provided for between 4 minutes and 60 minutes, such as between 6 minutes and 30 minutes, for example between 8 minutes and 15 minutes. For example, the cooling step in the chamber 300 may in aspects of the present disclosure be provided for a time less than 60 minutes, such as less than 30 minutes, for example less than 20 minutes such as less than 15 minutes. A further subsequent cooling after tc3 to further reduce the temperature of the lamination assembly may also be provided for a longer time subsequently after the hardening of the lamination layer 2 as illustrated in e.g. FIGS. 32 and 33.

In embodiments of the present disclosure, the cooling step may be provided from t0 and until the lamination assembly reached a temperature below 60° C. or below 45° C. at both surfaces 10a, 10b, and the time to reach this may be less than 60 minutes, such as less than 30 minutes, for example less than 20 minutes such as less than 15 minutes.

FIG. 34 illustrates schematically a cooling profile graph according to embodiments of the present disclosure. The cooling profile CP1 represents the temperature setting, and temperature of the cooling fluid/medium used for cooling the laminated side of the VIG unit, and the dash/dotted line L2 represents the temperature of the laminated VIG unit glass sheet 11b to which the lamination layer 2 is attached during the heating step.

As can be seen in FIG. 34, the temperature of the cooling fluid is initially set to a lower temperature which is significantly lower than a desired temperature target temperature Tta for the lamination assembly. It may for example be more than 30° C. such as more than 40° C., e.g. more than 50° C. below the target temperature Tta of the lamination material 2. For example, Tc1 may be below 50° C., such as below 40° C., e.g. below 30° C. Tta. This provides a faster cooling of the further glass sheet 3 than if the temperature was for example just 5° C. or 10° C. below the Tta, or at Ta, and hence a higher temperature transfer per time unit may be achieved, which is also illustrated By L1 where the temperature reduction per time unit is higher from t0 to ts than after the temperature of the cooling fluid is increased to Tc2 at the time ts. When the temperature of the cooling fluid is increased to Tc2, e.g. to be around the Tta or between 5° C.-15° C. below the target temperature Tta, this may help to reduce the heat transfer per time unit, and hence so to say avoid or reduce an undesired or unacceptable "overshot" situation for the temperature L1. Hence, this may help to reduce the time difference Δtc, see e.g. FIG. 33.

FIG. 35 illustrates an embodiment of the present disclosure wherein the temperature of the cooling fluid (see cooling profile CP) is maintained substantially constant during the cooling step from tc0-tc3. This provides a longer cooling time for the glass sheet 11b to reach the time tc2 where the temperature of the VIG glass sheet and the lamination layer 2 gets within the desired Target temperature Tta range (defined between Hysteresis H1 and target temperature in FIG. 35).

Though, the constant cooling temperature Tc1 may be lowered, which may speed up the cooling process and hence reduce the cooling time measured between t0-t2. In FIG. 36 (illustrating an embodiment of the present disclosure), this is the case, and hence the cooling time between tc0-tc2 may be reduced (ca seen when compared to FIG. 35), which may also help to reduce the overall cooling time for the lamination assembly.

In FIG. 36 (illustrating an embodiment of the present disclosure), the significantly lower temperature Tc1 (see FIG. 36) is maintained both during and after reaching time tc2, and this provides a continuous fast reduction in temperature through the temperature range around the target temperature Tta. This may be acceptable, but may demand a more controlled temperature regulation of the temperature of the unlaminated VIG unit glass sheet 11a, so as to e.g. control the final stress conditions caused by the VIG unit's thermal deflection and/or to avoid a too large temperature difference between the glass sheets 11a, 11b of the VIG unit 11.

In FIG. 35, a further embodiment of the present disclosure is illustrated, where, after t3 the cooling step to harden the lamination layer may be considered ended (to e.g. provide a controlled hardening of the lamination layer in a predefined temperature range), the heating profile temperature is reduced to further cool the VIG unit to a more advantageous handling temperature such as as below 60° C. or below 45° C. It is generally understood that the cooling step may be considered ended when the temperature of the lamination layer 2 is at the target temperature Tta of the lamination layer material, or a predefined temperature below, such as about 5° C.-15° C. below this rated temperature.

In further embodiments of the present disclosure, the cooling step may be considered ended when the lamination assembly's surfaces 10a, 10b reaches a "handling temperature" such as a temperature below 60° C. such as below 45° C.

FIG. 37 illustrates schematically a lamination solution comprising a heating step followed by a cooling step according to various embodiments of the present disclosure. Initially, a lamination assembly 10 as previously disclosed is provided. This is first subjected to a heating step at a heating location 100 so as to soften the lamination layer to provide a bonding between the VIG unit 11 and the lamination layer 2, and a bonding between the further sheet 3 and the lamination layer 2. This heating step may in embodiments of the present disclosure be provided in any suitable way, such as heating and clamping between clamping bodies, in a pressure chamber, by prior evacuation to remove gas bobbles between the lamination layer and the further sheet, and a subsequent heating or the VIG unit in at the location 100 as for example previously described in relation to one or more of the FIGS. 1-27b. It is however understood that other heating solutions at location 100 may be provided in further embodiments.

After this heating, the heated lamination assembly 10 with the heated and soft lamination layer 2 is moved to the cooling location 300, e.g. by a conveyer solution 16 such as a conveyer band solution, roller conveyers or the like on which the assembly 10 supports. Here, it is subjected to a cooling step as e.g. previously described. This is obtained by a cooling system 350 providing a controlled cooling, such as a forced cooling, of one or both major outer surfaces 10a, 10b of the heated lamination assembly so as to cool the heated lamination assembly to harden the lamination layer 2. Then the lamination assembly with the hardened lamination layer 2 leaves the cooling location 300, possibly after a further cooling to further reduce the temperature of the lamination assembly to a temperature where it may more easily be handled by automation equipment.

FIG. 38 illustrates schematically an embodiment of the present disclosure where a controlled cooling is provided after the heating step at the location 100, e.g. as previously described. Here the cooling step at the location 300 is provided as a continues cooling process where the laminated VIG unit is subjected to different cooling conditions at different cooling zones Z1-Zn from the start and to the end of the location 300 such as one or more cooling chambers.

Embodiments of this are illustrated in FIG. 39 in more details where cooling is provide by convection cooling at three Zones Z1-Zn, but it is generally understood that it may also be two zones or more than three zones in further embodiments, at one or both sides of the VIG unit.

For example, if the system 300 illustrated in FIG. 38 or 39 in embodiments of the present disclosure is used for providing the cooling profile CP1 illustrated in FIG. 34, Zone 1 may provide the cooling from the time tc0 to the time ts, the zone Z2 may be used for providing the cooling from the time ts to the time tc3, and the zone Zn may be used for providing the further cooling after the cooling step, i.e. after the time point tc3. Alternatively, this may be obtained in the same chamber in further embodiments.

In FIG. 39, a plurality of nozzles are provided to cool both the upwardly facing surface 10a, and the downwardly facing surface 10b in the first Zone 1a. The temperature of the cooling gas may be controlled by the heater or cooler 325, and/or the amount of cooling gas supplied per time unit may be controlled by the blowing unit 321. It is understood that the setting of the temperature of the cooling gas and/or the setting of the amount of cooling gas supplied per time unit may either be different or the same for both outer major surfaces 10a, 10b. Then the lamination assembly 10 enters the second, subsequent zone, e.g. as illustrated through an opening in a partition arrangement separating the zones Z1, Z2 as illustrated, and/or through an air curtain (not illustrated). Here, a further cooling to harden the lamination layer is provided, e.g. by means of a different temperature of the cooling gas and/or the setting of the amount of cooling gas supplied per time unit compared to the Zone Z1, and this may apply for both or one of the surfaces 10a, 10b of the lamination assembly. Then the lamination assembly enters the Zone Z3 to further cool to harden the lamination layer, or to reduce the temperature of the hardened lamination layer 2 and the rest of the VIG unit to a lower temperature before it leaves the outlet 302b.

The conveyer arrangement 16 may be moved with a continuous speed (without stops) from the inlet 302a to the outlet 302b, or may be moved with, e.g. predefined, time intervals, so as to move the lamination assemblies on the arrangement 16 between the zones Z1-Zn. It is understood that the conveyer arrangement may also comprise a plurality of individually controllable subparts to be able to adjust the feeding of the individual lamination assembly through the zones Z1-Zn.

It is to be understood that in further embodiments of the present disclosure, it may be a conduction cooling (see e.g. FIG. 40) or another cooling solution used for cooling at least one of the sides 10a, 10b of the lamination assembly 10, as e.g. previously described, at one or more of the zones Z1-Zn and the type of cooling (e.g. convection cooling, conduction cooling or the like) may be varied or be the same at the different zones Z1-Zn. For example, at the first zone Z1, the conduction cooling may be used to cool the further sheet 3, and at the second Z2 and/or third zone Zn, it may be convection cooling that is used to cool the same sheet 3. For example, various cooling solutions as disclosed in relation to FIGS. 28-31 may be used for the different zones Z1-Zn and may be different for these zones.

The different zones Z1-Zn may in embodiments of the present disclosure hence subject the lamination assembly 10 to different cooling environments, e.g. by providing different cooling temperatures at the different zones, by providing a different amount of cooling gas (in case of convection cooling) by a forced cooling at the different zones, by shifting between convection and conduction cooling and/or the like.

FIG. 40 illustrates schematically an embodiment of the present disclosure, where the cooling step is provided at different zones Z1-Zn as described In relation to e.g. FIGS. 38 and 39. Here, the cooling of the downwardly facing surface 10b of the VIG unit, e.g. the side where the further sheet and lamination layer 2 is placed, is provided by conduction cooling systems 310, which are set different for the different zones to e.g. provide a predetermined cooling profile CP1 during the transport of the lamination assembly 10 through the chamber 300. The temperature of the cooling fluid in the conduction cooling systems 310 at the different zones Z1-Zn may hence be set to be different in an embodiment of the present disclosure.

It is generally understood that even though a lamination assembly comprising a further sheet 3 and lamination layer 2 at just one side of the VIG unit and that the other side 10a may hence be unlaminated, is illustrated in the figures and described above, a lamination assembly 10 may also in further embodiments of the present disclosure comprise a further sheet and a lamination layer arranged at that surface. Such a lamination assembly hence comprises a VIG unit arranged between two lamination layers, and these two lamination layers are together with the VIG unit arranged between two further lamination glass sheets.

While the present disclosure has been described in detail in connection with only a limited number of embodiments or aspects, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. A laminated vacuum insulated glass (VIG) unit comprising:
   - a vacuum insulated glass unit comprising at least two thermally tempered glass sheets separated by a plurality of support structures distributed in a gap between the tempered glass sheets; and
   - a lamination layer arranged between one of the thermally tempered glass sheets of the vacuum insulated glass unit and a further sheet;
   - wherein a thickness of the lamination layer is between 0.25 mm and 3 mm;
   - wherein the lamination layer thickness varies by at least 0.1 mm between the further sheet and the one of the thermally tempered glass sheets;
   - wherein said variation of the lamination layer thickness is defined between neighboring crests and valleys of a surface of the thermally tempered glass sheet bonded to the lamination layer; and
   - wherein said crests and valleys are crests and valleys originating from roller waves provided during a thermal tempering process provided to thermally temper said thermally tempered glass sheets.

2. A laminated vacuum insulated glass unit according to claim 1, wherein the thickness of the lamination layer is between 0.4 mm and 3 mm.

3. A laminated vacuum insulated glass unit according to claim 1, wherein the lamination layer thickness varies with at least 0.2 mm between the further sheet and the vacuum insulated glass unit.

4. A laminated vacuum insulated glass unit according to claim 1, wherein said lamination layer is arranged proximate to a major surface of the VIG unit comprising a sealed gap evacuation opening.

5. A laminated vacuum insulated glass unit according to claim 4, wherein said sealed gap evacuation opening is covered by the lamination layer and/or the further sheet.

6. A laminated vacuum insulated glass unit according to claim 1, wherein said lamination layer is a multi-layer lamination layer.

7. A laminated vacuum insulated glass unit according to claim 6, wherein said multi-layer lamination layer comprises layers providing different properties.

8. A laminated vacuum insulated glass unit according to claim 1, wherein the further sheet is a glass sheet.

9. A laminated vacuum insulated glass unit according to claim 1, wherein said variation of the lamination layer thickness is defined between two crests of the surface of the tempered glass sheet bonded to the lamination layer.

10. A laminated vacuum insulated glass unit according to claim 9, wherein said two crests are separated by at least two such as at least three, such as at least five further crests in the surface.

11. A laminated vacuum insulated glass unit according to claim 1, wherein said lamination layer thickness varies with no more than 0.4 mm over at least 90% of the surface of the thermally tempered glass sheet to which the lamination layer bonds.

12. A laminated vacuum insulated glass unit according to claim 1, wherein said lamination layer thickness varies with no more than 0.3 mm over at least 95% of the surface of the thermally tempered glass sheet to which the lamination layer bonds.

13. A laminated vacuum insulated glass unit according to claim 1, wherein the further sheet is an annealed glass sheet.

14. A laminated vacuum insulated glass unit according to claim 1, wherein the lamination layer is provided by means of one or more lamination sheets.

15. A method for providing laminated vacuum insulated glass units according to claim 1, wherein said method comprises:
   providing a lamination assembly comprising
      a vacuum insulated glass unit comprising at least two, tempered glass sheets separated by a plurality of support structures distributed in a gap between the tempered glass sheets, and
      a lamination layer arranged between one of the tempered glass sheets of the vacuum insulated glass unit and a further sheet,
   arranging the lamination assembly between clamping bodies providing clamping surfaces, wherein at least one of said clamping surfaces is configured to be displaced by one or more clamping body displacers to change the distance between the clamping surfaces, and
   operating the one or more clamping body displacers to provide a compression pressure to the lamination assembly by means of the clamping surfaces, and
   heating the lamination assembly.

16. Method of providing a laminated vacuum insulated glass (VIG) unit according to claim 15, wherein said method comprises heating the outer major surfaces of the lamination assembly according to different heating profiles.

17. Method according to claim 16, wherein the method comprises operating one or more clamping body displacers to provide a compression pressure to the lamination assembly by means of clamping surfaces.

18. A laminated vacuum insulated glass unit according to claim 1, wherein said lamination layer is a Polyvinyl butyral and/or an Ethylene Vinyl Acetate layer.

* * * * *